(12) United States Patent
Swamy et al.

(10) Patent No.: US 10,521,419 B1
(45) Date of Patent: Dec. 31, 2019

(54) IDENTIFYING AN ISSUE ASSOCIATED WITH DATA

(71) Applicant: Accenture Global Solutions Limited, Dublin (IE)

(72) Inventors: Jayant Swamy, Bangalore (IN); Brajesh De, Bangalore (IN); Unmesh Salgaonkar, Mumbai (IN); Dhanashree Dalal, Pune (IN); Sankar Natarajan, Chennai (IN); Anitha Nayar, Bangalore (IN); Sanjeev Vohra, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/119,622

(22) Filed: Aug. 31, 2018

(51) Int. Cl.
*G06F 16/23* (2019.01)
*H04L 29/08* (2006.01)
*G06F 16/26* (2019.01)

(52) U.S. Cl.
CPC .......... *G06F 16/2365* (2019.01); *H04L 67/16* (2013.01); *G06F 16/26* (2019.01)

(58) Field of Classification Search
None
See application file for complete search history.

(56) References Cited

U.S. PATENT DOCUMENTS

| | | | | |
|---|---|---|---|---|
| 7,593,904 | B1* | 9/2009 | Kirshenbaum | G06N 99/005 706/12 |
| 2012/0084325 | A1* | 4/2012 | Bansode | G06F 17/30592 707/792 |
| 2013/0073531 | A1* | 3/2013 | Robinson | G06Q 10/06 707/694 |
| 2015/0186807 | A1* | 7/2015 | Scriffignano | G06Q 10/063 705/7.11 |
| 2016/0323767 | A1* | 11/2016 | Abdullah | H04W 16/18 |
| 2017/0329957 | A1* | 11/2017 | Vepa | G06F 21/445 |
| 2018/0032216 | A1* | 2/2018 | Naous | G06F 3/0482 |
| 2018/0039501 | A1* | 2/2018 | Jain | G06F 9/451 |

* cited by examiner

*Primary Examiner* — Christopher J Raab
(74) *Attorney, Agent, or Firm* — Harrity & Harrity, LLP

(57) ABSTRACT

A data intelligence platform may include a role-based workbench component configured to control access to or use of the data intelligence platform to identify an issue associated with data associated with an organization. The data intelligence platform may include a data intelligence component configured to: process the data to identify the issue related to the data, or perform a set of actions related to fixing the issue related to the data based on a result of processing the data. The data intelligence platform may include a data management component configured to facilitate access to a corpus component or to a source of the data. The data intelligence platform may include the corpus component configured to facilitate processing of the data to identify the issue or to perform the set of actions.

20 Claims, 11 Drawing Sheets

# IDENTIFYING AN ISSUE ASSOCIATED WITH DATA

BACKGROUND

An organization may generate data related to operations of the data. For example, the organization may generate data related to individuals associated with the organization, activities of the organization and/or products and/or services associated with the organization. The data may be stored across multiple data sources and/or may be formatted in a particular manner. For example, the data may be stored in a server device and/or may have particular types of attributes.

SUMMARY

According to some possible implementations, a data intelligence platform may comprise: a role-based workbench component configured to control access to or use of the data intelligence platform, wherein the role-based workbench component comprises a set of user interfaces associated with at least one of: different roles, associated with an organization, that are permitted to use the data intelligence platform, or different functionalities of the data intelligence platform; a data intelligence component configured to: process data, utilizing a set of microservices or a set of models, to identify an issue related to the data, wherein the data is associated with the organization, or perform a set of actions related to fixing the issue related to the data based on a result of processing the data utilizing the set of microservices or the set of models; a data management component configured to facilitate access to a corpus component or to a source of the data; and the corpus component configured to facilitate processing of the data to identify the issue or to perform the set of actions, wherein the corpus component stores at least one of: a common corpus related to various industries or organizations, an industry corpus related to an industry associated with the organization, or an organization corpus related to the organization.

According to some possible implementations, a system may comprise: a role-based workbench component configured to control access to or use of the system to identify an issue associated with data associated with an organization, wherein the role-based workbench component comprises a set of user interfaces associated with at least one of: different roles, associated with the organization, that are permitted to use the system, or different functionalities of the system; a data intelligence component configured to: process the data, utilizing a set of microservices or a set of models, to identify the issue related to the data, or perform a set of actions related to fixing the issue related to the data based on a result of processing the data utilizing the set of microservices or the set of models; a data management component configured to facilitate access to a corpus component or to a source of the data; and the corpus component configured to facilitate processing of the data to identify the issue or to perform the set of actions, wherein the corpus component stores a set of corpora to be used to process the data or to perform the set of actions.

According to some possible implementations, a device may comprise: a role-based workbench component configured to control access to or use of one or more other components of the device; a data intelligence component configured to: process data, utilizing a set of microservices or a set of models, to perform at least one of: data discovery related to the data, data veracity related to the data, or data curation related to the data, or perform a set of actions related to fixing an issue identified in the data based on a result of processing the data utilizing the set of microservices or the set of models; a data source configured to store the data; a data management component configured to facilitate access to a corpus component or to the data source of the data, wherein the data management component comprises: a metadata management component, or a data access component; and the corpus component configured to facilitate, via use of a set of corpora, processing of the data or performing the set of actions.

DETAILED DESCRIPTION

Figure 1:
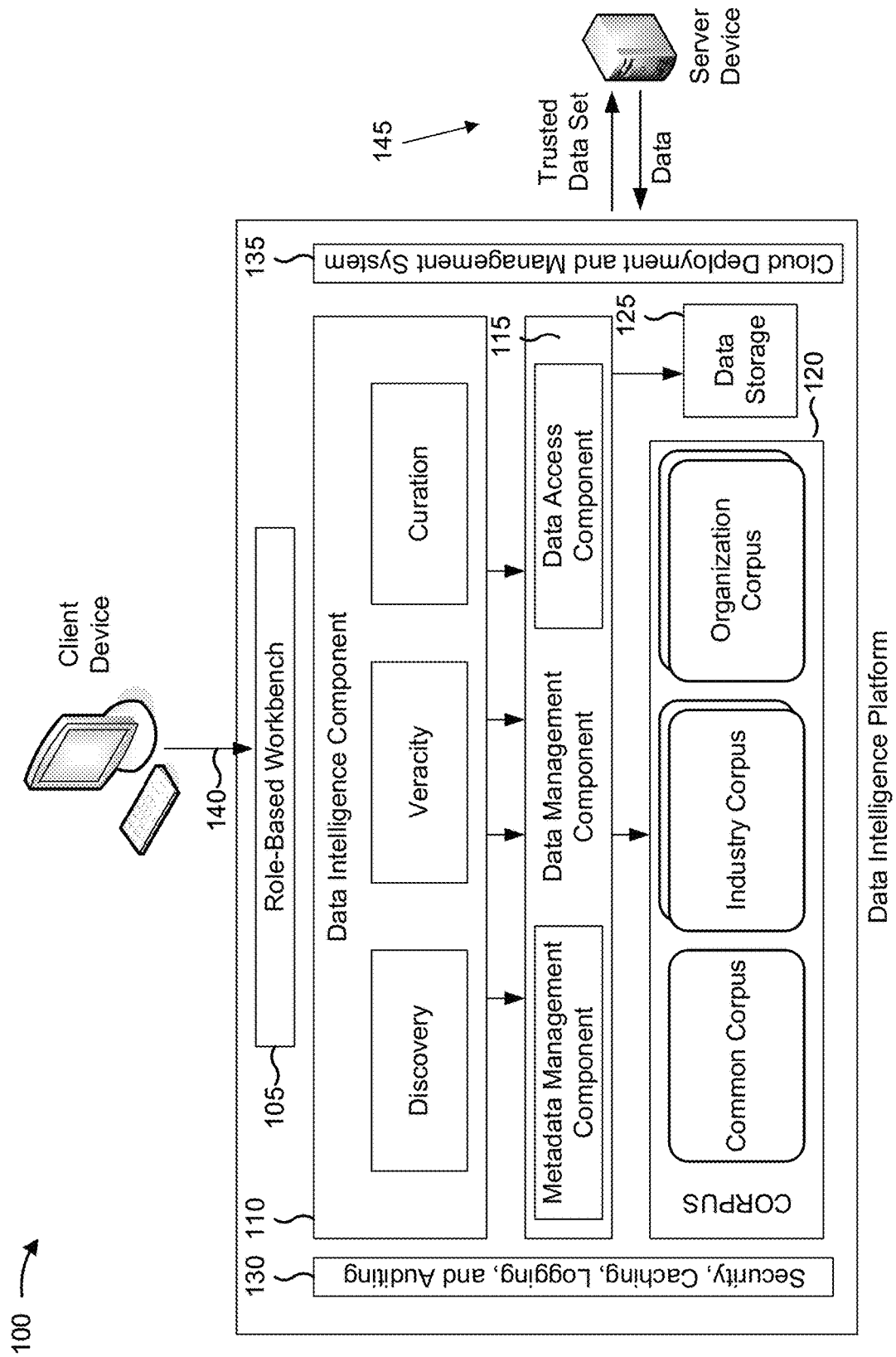
FIG. 1 is a diagram of an example implementation described herein.

The following detailed description of example implementations refers to the accompanying drawings. The same reference numbers in different drawings may identify the same or similar elements.

An organization may generate data related to operations of the organization. For example, the organization may generate millions, billions, or more data elements related to the operations of the organization. The data may be stored across hundreds, thousands, or more data sources that are located on premises of the organization, that are cloud based (e.g., spread across various geographic locations), that are located at a third-party premises, and/or the like. In addition, the organization may generate the data at a rate of thousands, millions, or more data elements per day. These factors can significantly impair the organization's capability to understand the data that the organization is generating, the locations where the data is being stored, the manners in which the organization is using the data, and/or the like. In addition, these factors can significantly impair the organization's capability to correct data elements due to an issue associated with the data, such as an issue related to a value of the data (e.g., a value outside of an acceptable value range), a format of the data (e.g., mis-formatted data), a storage location of the data (e.g., a device, a data center, and/or the like), and/or the like.

Some implementations described herein provide a data intelligence platform that is capable of identifying data generated by an organization (e.g., types of data generated by the organization), storage locations of the data, and/or manners in which the organization uses the data. In addition, the data intelligence platform may be capable of analyzing the data to identify an issue related to the data, performing an action to fix the issue, and/or the like. In this way, the data intelligence platform provides a tool that can be used to provide an organization with insight into data generated by the organization and/or to improve the data, in a manner not previously possible. This reduces an amount of time needed to analyze data generated by an organization, thereby improving an efficiency of analyzing data related to the organization. In addition, this conserves computing resources that would otherwise be consumed analyzing the data in a less efficient manner. Further, this improves a quality of the data, thereby conserving processing resources that would otherwise be consumed processing data that includes an issue.

In this way, several different stages of the process for identifying an issue associated with data are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to identify a location where data is stored and/or to identify an issue associated with data. Finally, automating the process for identifying an issue associated with data conserves computing resources (e.g., processor resources, memory resources, and/or the like) that would otherwise be wasted in attempting to identify an issue associated with data, and computing resources of a device that would be wasted processing data that includes an issue.

FIG. 1 is a diagram of an example implementation 100 described herein. As shown in FIG. 1, implementation 100 includes a client device, a server device and a data intelligence platform.

As shown by reference number 105, the data intelligence platform may include a role-based workbench component. In some implementations, the role-based workbench component may be configured to control access to and/or use of the data intelligence platform (e.g., by facilitating login procedures, authentication procedures, and/or the like). For example, the role-based workbench component may provide a set of user interfaces that is associated with different roles that could access and/or use the data intelligence platform (e.g., an administrative role for an administrative user, an analyst role for an analyst user, a data scientist role for a data scientist user, an industry expert for an industry expert user, and/or the like). Continuing with the previous example, different roles may be permitted to access different functionalities of the data intelligence platform, may have different authentication processes to access the data intelligence platform, and/or the like.

Additionally, or alternatively, and as another example, the set of user interfaces may be associated with various functionalities of the data intelligence platform. For example, a first subset of user interfaces may be associated with a first functionality, a second subset of user interfaces may be associated with a second functionality, and/or the like (e.g., the first subset of user interfaces may be associated with a discovery functionality, a second subset of user interfaces may be associated with a veracity functionality, a third subset of user interfaces may be associated with a curation functionality, and so forth).

In some implementations, the role-based workbench component may be associated with authentication and/or authorization of a user of the data intelligence platform. For example, the role-based workbench component may provide a user interface and/or perform functionality related to login of the user, access by the user to components and/or functionality of the data intelligence platform, and/or the like. Continuing with the previous example, the data intelligence platform may utilize the role-based workbench component to request, receive, and/or verify a username/password combination, biometric information (e.g., a finger print scan, a voice scan, and/or the like), a security token, and/or the like.

As shown by reference number 110, the data intelligence platform may include a data intelligence component. For example, the data intelligence component may be configured to process data associated with an organization, such as to identify an issue related to the data. For example, the data intelligence platform may process the data utilizing a set of microservices or a set of models associated with and/or accessible via the data intelligence component.

In some implementations, the data intelligence component may include a discovery component. For example, the discovery component may be configured to perform data discovery related to the data. In some implementations, when performing data discovery, the discovery component may process data related to an organization to identify data sources of the data. For example, the discovery component may identify locations where the data is stored (e.g., identifiers of devices that store the data, whether the locations are on premises of the organization and/or are cloud-based based on metadata associated with the data, and/or the like), operations of the organization with which the data is associated, amounts of data associated with the organization, and/or the like. In some implementations, when performing data discovery, the discovery component may process data stored across hundreds, thousands, or more systems and/or devices associated with the organization. In this way, the discovery component may process a data set and/or may perform data discovery in a manner not possible by a human actor.

Additionally, or alternatively, the data intelligence component may include a veracity component. For example, the veracity component may be configured to perform data veracity related to the data. In some implementations, when performing data veracity, the veracity component may process data associated with an organization to determine whether the data is properly formatted, to determine whether the data is accurate, and/or the like. For example, the veracity component may determine whether the values for the data are within a particular range, include proper alphanumeric values, and/or the like by utilizing a machine learning model to process thousands, millions, or more data elements from various sources of data. In this way, the veracity component may process a data set that cannot be processed manually by a human actor.

Additionally, or alternatively, the data intelligence component may include a curation component. For example, the curation component may be configured to perform data curation related to the data. In some implementations, when performing data curation, the curation component may process the data to fix an issue related to the data (e.g., a formatting issue, an accuracy issue, and/or the like), may process the data to modify the data for a particular need of the organization (e.g., a first department of the organization may have generated the data, and a second department of the organization may need the data formatted in a different way than originally formatted when generated by the first department), and/or the like. In some implementations, the curation component may perform data curation on thousands, millions, or more data elements, such as by utilizing a machine learning model to process the data elements to perform the data curation. In this way, the curation component may process a data set that cannot be processed manually by a human actor.

In this way, the data intelligence platform is capable of identifying data associated with an organization (e.g., across thousands, millions, or more sources of data), determining a quality of the data (e.g., whether the data includes an issue, as the data moves throughout a data supply chain associated with the data, and/or the like), and/or processing the data to fix the data and/or place the data in a needed form. In this way, the data intelligence platform provides a tool that an organization can use to perform these actions in a manner not previously possible and/or not possible by a human actor.

As shown by reference number 115, the data intelligence platform may include a data management component. For example, the data management component may be configured to facilitate access to a corpus component associated with the data intelligence platform and/or to a source of the data (e.g., a source of data associated with the organization and/or with the data intelligence platform). Continuing with the previous example, the data management component may provide the data intelligence component with connectivity to the corpus component, to a source of the data (e.g., hundreds, thousands, or more sources of the data), and/or the like.

In some implementations, the data management component may include a metadata management component. For example, the metadata management component may be configured to manage and/or process metadata related to data that the data intelligence platform is processing. In some implementations, the metadata management component may gather metadata related to the data, may provide access to the metadata (e.g., via the role-based workbench), may process the metadata utilizing the corpora that the corpus component is storing, such as to identify an issue related to the metadata, and/or the like. In some implementations, the metadata management component may generate a visualization for the data (e.g., a chart, a graph, a table, and/or the like) and may provide the visualization for display via a display associated with the data intelligence platform and/or the client device.

Additionally, or alternatively, the data management component may include a data access component. For example, the data access component may be configured to manage access to data being processed by the data intelligence platform. In some implementations, the data access component may gather the data for analysis (e.g., from a source of data associated with an organization, from data storage associated with the data intelligence platform on behalf of a component of the data intelligence platform, and/or the like), may request authentication of a user of the data intelligence platform to permit access of the user of the data intelligence platform to the data (e.g., by causing a login user interface to be provided for display via a display associated with the data intelligence platform and/or the client device, by outputting a notification for display that requests input of authentication information associated with the user, and/or the like), and/or the like.

As shown by reference number 120, the data intelligence platform may include a corpus component. In some implementations, the corpus component may be configured to facilitate processing of the data to identify an issue associated with the data and/or to perform a set of actions related to the issue, to perform an action related to the data based on the issue, and/or the like. For example, the corpus component may store one or more corpora to be used to process the data to identify the issue, to fix the issue, and/or the like, such as a common corpus, an industry corpus, an organization corpus, and/or the like. In some implementations, a corpus may include information that identifies formatting rules for data, value ranges for data, acceptable tolerances for accuracy of data, attributes (e.g., rows and/or columns) that are expected to be included in the data, data elements that are expected to be included in the data, metadata that is expected to be associated with the data, and/or the like.

In some implementations, the corpus component may store a common corpus related to various industries and/or organizations. For example, the common corpus may include information related to data that is common across various industries and/or organizations, such as rules related to formatting of data, attributes included in the data, and/or the like that are common across various industries and/or organizations.

Additionally, or alternatively, the corpus component may store an industry corpus related to an industry associated with the organization. For example, the industry corpus may include information related to data that is common across a particular industry, such as rules related to formatting of data, attributes included in the data, and/or the like. In some implementations, the corpus component may store dozens, hundreds, or more industry corpora that can be used to analyze data related to organizations operating in dozens, hundreds, or more industries. In this way, the data intelligence platform may be configured and/or customized to process data in a contextualized manner for various industries.

Additionally, or alternatively, the corpus component may store an organization corpus related to an organization. For example, the organization corpus may include information related to data associated with a particular organization, such as rules related to formatting of data, attributes included in the data, and/or the like associated with the particular organization. In some implementations, the corpus component may store hundreds, thousands, or more organization corpora that can be used to analyze data related to hundreds, thousands, or more organizations. In this way, the data intelligence platform may be configured and/or customized to process data in a contextualized manner for various organizations. In this way, the data intelligence platform, utilizing the corpus component, can provide a customizable analysis of data in a manner not previously possible (e.g., customizable by industry, by organization, and/or the like).

In some implementations, the corpora stored by the corpus component may be implemented as a graph structure. For example, a corpus (e.g., the common corpus, the industry corpus, and/or the organization corpus) may be implemented as a graph data structure of nodes and/or edges that can be used to process the data in the manner described herein. This facilitates efficient management and/or use of the corpora, thereby conserving processing resources related to use of the corpora.

As shown by reference number 125, the data intelligence platform may include a data storage component. For example, the data intelligence platform may use the data storage component to store data to be analyzed, may store a result of analyzing the data, may store fixed data to be provided to the organization, and/or the like. In some implementations, the data intelligence platform may use the data storage to copy data from the organization for analysis prior to analyzing and/or fixing the data. This reduces or eliminates a risk of the data intelligence platform inadvertently introducing errors to the data that the organization is actively using, reduces or eliminates a risk of overloading computing resources associated with the organization during analysis of the data and/or fixing of the data, reduces or eliminates a risk of interruptions to operations of the organization due to the data intelligence platform performing the analysis of the data and/or fixing of the data, and/or the like.

As shown by reference number 130, the data intelligence platform may utilize and/or implement a set of common services for one or more components of the data intelligence platform. For example, the data intelligence platform may utilize the set of common services to control access to the one or more components and/or the data intelligence platform, to control and/or supplement functioning of the one or more components and/or of the data intelligence platform, to provide a service to the one or more components and/or to the data intelligence platform, and/or the like.

In some implementations, the set of common services may include a security service (e.g., authentication, intrusion detection, and/or the like), a caching service (e.g., to queue requests for use of the one or more components and/or of the data intelligence platform, to store results of analyses that the data intelligence platform and/or the one or more components perform, and/or the like), a logging service (e.g., to log use of the data intelligence platform and/or the one or more components, to log crashes or other issues related to the data intelligence platform and/or the one or more components, and/or the like), an auditing service (e.g., to assess functioning of the data intelligence platform and/or the one or more components, to assess access to and/or use of the data intelligence platform and/or the one or more components, and/or the like), and/or the like. In some implementations, the data intelligence platform may utilize the set of common services during operation of the data intelligence platform, based on input to the data intelligence platform from a user of the data intelligence platform, and/or the like.

In some implementations, the set of common services may be centralized to the data intelligence platform. For example, the data intelligence platform may implement the set of common services such that any of the components can access the set of common services. As a specific example with regard to the logging service, the data intelligence platform may implement a centralized logging service to log errors and/or events from the components of the data intelligence platform in a central repository. This reduces or eliminates a need for duplicative implementation of services (which conserves memory resources of the data intelligence platform), facilitates sharing of information among components of the data intelligence platform, and/or the like.

As shown by reference number 135, the data intelligence platform may include a cloud deployment and management system. For example, the cloud deployment and management system may include one or more devices and/or components configured to perform various actions related to a cloud deployment of the data intelligence platform. For example, the cloud deployment and management system may perform a set of actions related to deploying the data intelligence platform in a cloud-based environment (e.g., may perform install and/or uninstall actions on various cloud-based computing devices, may identify cloud-based computing devices on which the data intelligence platform is to be deployed or is deployed, and/or the like), may perform a set of actions related to managing a cloud-based deployment of the data intelligence platform (e.g., may monitor operation of the data intelligence platform by gathering various metrics, may perform failover services for the data intelligence platform in an event of a data center outage, and/or the like), and/or the like.

In some implementations, the cloud deployment and management system may provide information related to a cloud-based deployment of the data intelligence platform for display via a display associated with the data intelligence platform and/or the client device. For example, the data intelligence platform may provide metrics related to operation of a cloud-based deployment of the data intelligence platform for display, information that identifies a location of computing resources on which the data intelligence platform is deployed, information that identifies an occurrence of a data center outage (or other issue related to the cloud-based deployment) for display and any corrective actions that the data intelligence platform performed, and/or the like.

In some implementations, when processing data associated with an organization in the manner described herein, the data intelligence platform may utilize a set of microservices (e.g., the discovery component may utilize a first set of microservices to perform data discovery, the veracity component may utilize a second set of microservices to perform data veracity, the curation component may utilize a third set of microservices to perform data curation, and/or the like). For example, the data intelligence platform may utilize the set of microservices to process the data to identify an issue related to the data, to fix the data, and/or the like. As specific examples, the data intelligence platform may utilize the set of microservices to identify the data across multiple sources of data associated with the organization (e.g., multiple systems and/or devices) and/or to identify a structure of the data (e.g., a format of the data, attributes and/or data elements included in the data, and/or the like). Continuing with the previous specific examples, the data intelligence platform may utilize the set of microservices to detect an anomaly in the data that is indicative of the data including an issue, to fix the issue, and/or the like.

In this way, different functionalities of the data intelligence platform may be independently modeled and/or deployed as different microservices. This facilitates introduction of new functionality, customization of existing functionality, and/or the like in an agile, flexible, and/or modularized manner, which may reduce or eliminate downtime of the data intelligence platform, may reduce or eliminate interruptions to operations of the data intelligence platform during introduction and/or modification of functionality of the data intelligence platform, and/or the like.

In some implementations, the set of microservices may be deployed via a set of containers. For example, the data intelligence platform may utilize a set of containers to implement functionality of one or more of the components of the data intelligence platform (e.g., functionality associated with the set of microservices). In some implementations, the set of containers may be modularized (e.g., may be separately deployed from each other). This facilitates quick, easy, and customizable deployment of the data intelligence platform to different on-premises and/or cloud environments, thereby facilitating portability of the data intelligence platform. In addition, this facilitates process-level isolation of functionality and/or components of the data intelligence platform.

In some implementations, when processing the data, the data intelligence platform may utilize a set of machine learning models. For example, the data intelligence platform may utilize the set of machine learning models to identify data in sources of the data, to identify an issue related to the data, to fix the issue, and/or the like. In some implementations, the machine learning model may have been trained to perform these actions, as described elsewhere herein. For example, the data intelligence platform may input data to be processed into the machine learning model, and the machine learning model may output information that indicates whether the data includes an issue, may output fixed data, may output a recommendation related to the data (e.g., a recommended fix to the data), and/or the like based on the manner in which the machine learning model was trained.

In some implementations, the data intelligence platform may generate the machine learning model. For example, the data intelligence platform may have trained the machine learning model to identify an issue included in data and/or to fix the issue.

In some implementations, the data intelligence platform may have trained the machine learning model on a training set of data. For example, the training set of data may include data related to operations of an organization and data that identifies an issue included in the data, a fix for the issue, a recommendation related to the data, and/or the like. Additionally, or alternatively, when the data intelligence platform inputs the data related to the operations of the organization into the machine learning model, the data intelligence platform may input a first portion of the data as a training set of data, a second portion of the data as a validation set of data, and third portion of the data as a test set of data (e.g., to be used to identify the issue, to determine the fix for the issue, and/or the like). In some implementations, the data intelligence platform may perform multiple iterations of training of the machine learning model, depending on an outcome of testing of the machine learning model (e.g., by submitting different portions of the data as the training set of data, the validation set of data, and the test set of data).

In some implementations, when generating the machine learning model, the data intelligence platform may utilize logistic regression to generate the machine learning model. For example, the data intelligence platform may utilize a binary classification of the data related to the operations of the organization (e.g., a classification of including an issue or not including an issue) to train the machine learning model to identify the issue based on the classification of the data. Additionally, or alternatively, when generating the machine learning model, the data intelligence platform may utilize a Naive Bayesian classifier to train the machine learning model. For example, the data intelligence platform may utilize binary recursive partitioning to divide the data related to the operations of the organization into various binary categories (e.g., starting with the binary categories of including an issue or not including an issue). Based on using recursive partitioning, the data intelligence platform may reduce utilization of computing resources relative to manual, linear sorting and analysis of data points, thereby enabling use of thousands, millions, or billions of data points to train a machine learning model, which may result in a more accurate machine learning model than using fewer data points.

Additionally, or alternatively, when generating the machine learning model, the data intelligence platform may utilize a support vector machine (SVM) classifier. For example, the data intelligence platform may utilize a linear model to implement non-linear class boundaries, such as via a max margin hyperplane. Additionally, or alternatively, when utilizing the SVM classifier, the data intelligence platform may utilize a binary classifier to perform a multi-class classification. Use of an SVM classifier may reduce or eliminate overfitting, may increase a robustness of the machine learning model to noise, and/or the like.

In some implementations, the data intelligence platform may train the machine learning model to identify an issue in data, to determine a fix for the data, and/or the like using a supervised training procedure that includes receiving input to the machine learning model from a subject matter expert, which may reduce an amount of time, an amount of processing resources, and/or the like to train the machine learning model relative to an unsupervised training procedure. In some implementations, the data intelligence platform may use one or more other model training techniques, such as a neural network technique, a latent semantic indexing technique, and/or the like. For example, the data intelligence platform may perform an artificial neural network processing technique (e.g., using a two-layer feedforward neural network architecture, a three-layer feedforward neural network architecture, and/or the like) to perform pattern recognition with regard to patterns of issues included in data, patterns of fixes for the issues, and/or the like. In this case, using the artificial neural network processing technique may improve an accuracy of a model generated by the data intelligence platform by being more robust to noisy, imprecise, or incomplete data, and by enabling the data intelligence platform to detect patterns and/or trends undetectable to human analysts or systems using less complex techniques.

As an example, the data intelligence platform may use a supervised multi-label classification technique to train the machine learning model. For example, as a first step, the data intelligence platform may map data associated with operations of the organization to a set of issues after labeling the data. In this case, the data may be characterized as including an issue, not including an issue, and/or the like (e.g., by a technician, thereby reducing processing relative to the data intelligence platform being required to analyze the data to determine whether the data includes an issue). As a second step, the data intelligence platform may determine classifier chains, whereby labels of target variables may be correlated (e.g., in this example, labels may indicate whether the data includes an issue and correlation may refer to features of the data common to the different labels, and/or the like). In this case, data intelligence platform 930 may use an output of a first label as an input for a second label (as well as one or more input features, which may be other data relating to the operations of the organization), and may determine a likelihood that particular data includes an issue based on a similarity to other data that includes similar features. In this way, the data intelligence platform transforms classification from a multilabel-classification problem to multiple single-classification problems, thereby reducing processing utilization.

As a third step, the data intelligence platform may determine a Hamming Loss Metric relating to an accuracy of a label in performing a classification by using the validation set of the data (e.g., an accuracy with which a weighting is applied to data and whether the data includes an issue, results in a correct prediction of whether data includes an issue, and/or the like, thereby accounting for variations among data sets). As a fourth step, the data intelligence platform may finalize the machine learning model based on labels that satisfy a threshold accuracy associated with the Hamming Loss Metric, and may use the machine learning model for subsequent prediction of whether data includes an issue, identification of a fix for the issue, and/or the like.

In some implementations, the set of containers, the set of microservices, the set of models, the set of components, and/or the like associated with the data intelligence platform may be connected to each other and/or accessed via a set of application programming interfaces (APIs). For example, these aspects of the data intelligence platform may be connected to each other via a set of APIs that includes a set of representational state transfer (REST) APIs.

As shown by reference number 140, the client device may communicate with the data intelligence platform via the role-based workbench component (e.g., via a set of user interfaces associated with the role-based work bench, such as a set of web-based user interfaces). In some implementations, the client device may communicate with the data intelligence platform via a JavaScript Object Notation (JSON) connection.

As shown by reference number 145, the data intelligence platform may communicate with the server device to receive data to be analyzed and/or to provide a result of an analysis of the data. For example, the data intelligence platform may receive data from the server device associated with an organization and may process the data in a manner that is the same as or similar to that described herein. Additionally, or alternatively, and as another example, the data intelligence platform may provide a trusted data set to the server device (e.g., to facilitate use of the trusted data set by an organization associated with the server device). Continuing with the previous example, the trusted data set may no longer include an issue after being processed by the data intelligence platform, and may include data that conforms to the various corpora stored by the corpus component. In this way, the data intelligence platform may provide a data set to the server device that, when processed, can conserve computing resources associated with the organization that would have otherwise been consumed using a data set that includes an issue.

In some implementations, when receiving and/or providing data, the data intelligence platform may utilize encryption to secure the data, may utilize an encrypted connection between the data intelligence platform and a device with which the data intelligence platform is communicating, and/or the like. Additionally, or alternatively, data that the data intelligence platform stores may be encrypted and/or anonymized. This increases a security of the data while being stored by the data intelligence platform, while in transit between the data intelligence platform and another device, and/or the like.

In some implementations, the data intelligence platform may utilize different techniques for receiving and/or providing data based on a type and/or volume of the data. For example, the data intelligence platform may utilize an extract, transform, load (ETL)-based technique based on the type and/or the volume of the data (e.g., for small and/or medium volume data). Additionally, or alternatively, and as another example, the data intelligence platform may utilize a multi-part parallel processing-based technique based on the type and/or the volume of the data (e.g., for large volume data). In some implementations, the data intelligence platform may utilize a big data tool to process large volume data in the manner described herein, such as MapReduce program. In this way, the data intelligence platform may be scalable for data with different characteristics.

In this way, the data intelligence platform provides a secure, configurable, scalable, and/or portable tool that an organization can use to identify an issue associated with data and/or to fix the issue. In addition, in this way, the data intelligence platform provides a tool that can connect to multiple sources of data for multiple organizations and can provide insight into data associated with the organizations via determination of metrics, generation of recommendations for the data, improvement of a quality of the data, and/or the like. Further, in this way, the data intelligence platform may implement multiple levels of security (e.g., authentication, access control encryption, container-based isolation, and/or the like). This facilitates a seamless combination of intelligent performance of data discovery, data veracity, and/or data curation by the data intelligence platform, which can provide an organization with insight into data associated with the organization, with a way to automatically fix an issue identified in the data, and/or the like in a manner not previously possible.

As indicated above, FIG. 1 is provided merely as an example. Other examples are possible and may differ from what was described with regard to FIG. 1.

Figure 2:
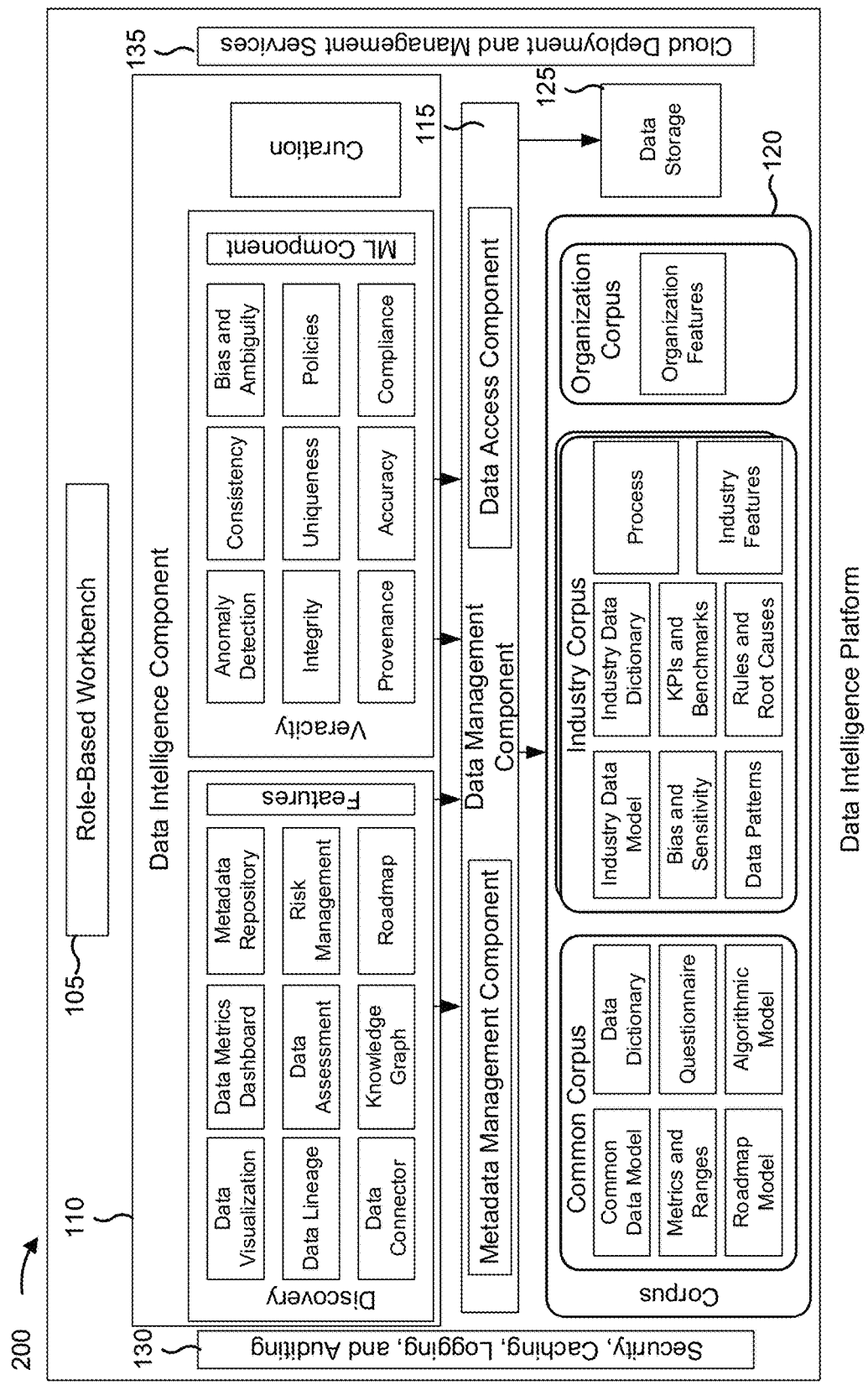
FIG. 2 is a diagram of an example implementation described herein.

FIG. 2 is a diagram of an example implementation 200 described herein. As shown in FIG. 2, implementation 200 includes a data intelligence platform that is the same as or similar to that described elsewhere herein. FIG. 2 shows a detailed architecture of some of the components of the data intelligence platform described with regard to FIG. 1.

As shown in FIG. 2, the discovery component may include various components related to performing data discovery. For example, the discovery component may include a data visualization component, which may generate visualizations of the data and/or of a virtual map of sources of the data (e.g., may generate a system map of systems, devices, and/or the like that store data, may generate a table that includes the data, and/or the like), and may provide the visualizations for display. Additionally, or alternatively, and as another example, the discovery component may include a data metrics dashboard component, which may determine metrics related to the data and/or may provide the metrics for display. Additionally, or alternatively, and as another example, the discovery component may include a metadata repository component, which may store metadata related to the data.

Additionally, or alternatively, and as another example, the discovery component may include a data lineage component, which may determine a data lineage of the data (e.g., information that identifies an origin of the data, systems that use the data, and/or the like) and may provide information related to the data lineage for display. Additionally, or alternatively, and as another example, the discovery component may include a data assessment component, which may determine types of data included in the data, a format of the data, a size of the data, and/or the like. Additionally, or alternatively, and as another example, the discovery component may include a risk management component, which may determine a likelihood that the data includes an issue (e.g., based on the type of the data, whether the data was manually generated in a system, and/or the like) and may utilize information identifying the likelihood when processing the data (e.g., a more rigorous process may be used to process the data when the likelihood satisfies a threshold).

Additionally, or alternatively, and as another example, the discovery component may include a data connector component, which may provide connectivity from the discovery component to the data management component, to a source of the data (or a data storage component associated with data intelligence platform), and/or the like. Additionally, or alternatively, and as another example, the discovery component may include a knowledge graph component, which may generate a knowledge graph of the data, such a knowledge graph that identifies common systems that use portions of the data, common storage locations of different portions of the data, and/or the like. In some implementations, this information may be used by the data intelligence platform to determine a fix for an issue identified in the data, to generate a recommendation for the data, and/or the like. Additionally, or alternatively, and as another example, the discovery component may include a roadmap component, which may generate a recommendation for improving a quality of the data based on an issue identified in the data.

As further shown in FIG. 2, the veracity component may include various components related to performing data veracity. For example, the veracity component may include an anomaly detection component, which may detect an anomaly in the data that is indicative of the data including an issue. Additionally, or alternatively, and as another example, the veracity component may include a consistency component, which may determine a consistency of the data (e.g., whether formatting of the data is consistent, whether data elements and/or attributes included in the data are consistent, and/or the like). Additionally, or alternatively, and as another example, the veracity component may include a bias and ambiguity component, which may identify biases and/or ambiguities within the data (e.g., may determine that retail data is biased toward a particular age group or gender), and may use this information when identifying an issue, when determining a fix for the issue, when generating a recommendation for the data, and/or the like.

Additionally, or alternatively, and as another example, the veracity component may include an integrity component, which may determine a completeness of the data (e.g., whether data elements are missing from the data). Additionally, or alternatively, and as another example, the veracity component may include a uniqueness component, which may determine whether the data includes duplicative data elements. Additionally, or alternatively, and as another example, the veracity component may include a policies component, which may determine whether the data conforms to particular rules and/or policies associated with the organization (e.g., encryption rules and/or policies, file size limits, and/or the like). In some implementations, the policies component may utilize one or more of the corpora described elsewhere herein to process the data. Additionally, or alternatively, and as another example, the veracity component may include a provenance component, which may determine manners in which the data has been manipulated after being generated (e.g., via use of metadata and/or logs that identify changes to the data).

Additionally, or alternatively, and as another example, the veracity component may include an accuracy component, which may determine an accuracy of data elements within the data (e.g., by determining whether values for the data are within a range of values, whether values for the data include a threshold quantity of decimal places, and/or the like). Additionally, or alternatively, and as another example, the veracity component may include a compliance component, which may determine whether the data has been generated according to particular practices (e.g., security practices, anonymization practices, and/or the like). In some implementations, the compliance component may utilize one or more of the corpora described elsewhere herein to process the data. Additionally, or alternatively, and as another example, the veracity component may include a machine learning (ML) component, which may implement and/or utilize one or more of the machine learning models described elsewhere herein to process data.

As further shown in FIG. 2, the various corpora may include various features and/or information. For example, the common corpus may include a common data model, which may identify attributes and/or data elements that are expected to be included in the data, limitations on values for the data, and/or the like (e.g., that are common across industries and/or organizations). Additionally, or alternatively, and as another example, the common corpus may include a data dictionary, which may identify an expected formatting of the data, a structure of the data, a relationship between data from different sources of data, and/or the like.

Additionally, or alternatively, and as another example, the common corpus may include metrics and ranges information that identifies metrics and/or ranges for the data (e.g., metrics to be used to determine a quality of the data, ranges of expected values for the metrics, and/or the like). Additionally, or alternatively, and as another example, the common corpus may include questionnaire information that identifies a result of a questionnaire provided to individuals associated with an organization related to practices of the organization with regard to the data (e.g., actual practices versus expected practices), manners in which the data is used (e.g., actual uses versus expected uses), and/or the like. In some implementations, the information may be used by a machine learning model to determine whether the data includes an issue, to resolve discrepancies between a form of the data and an expected form of the data, and/or the like.

Additionally, or alternatively, and as another example, the common corpus may include a roadmap model, which may include a machine learning model that has been trained to provide recommendations related to fixing an issue in the data. Additionally, or alternatively, and as another example, the common corpus may include an algorithmic model, which may include a machine learning model to facilitate analysis of the data utilizing the common corpus.

As further shown in FIG. 2, the industry corpus may include various features and/or information. For example, the industry corpus may include an industry data model similar to the common data model described above. Additionally, or alternatively, and as another example, the industry corpus may include an industry data dictionary similar to the data dictionary described above with regard to the common corpus. Additionally, or alternatively, and as another example, the industry corpus may include bias and sensitivity information related to determining a bias and/or a sensitivity of the data (e.g., related to determining whether the data is skewed in a particular manner, determining a confidence of an accuracy associated with the data, and/or the like). Additionally, or alternatively, and as another example, the industry corpus may include information related to metrics to be used to analyze the data (e.g., key performance indicators (KPIs), benchmarks, and/or the like).

Additionally, or alternatively, and as another example, the industry corpus may include information that identifies expected data patterns in the data. Additionally, or alternatively, and as another example, the industry corpus may include rules and root causes information to be used to determine whether the data satisfies a set of industry-related rules, to identify root causes of issues in the data from an industry perspective, and/or the like. Additionally, or alternatively, and as another example, the industry corpus may include process information to be used to analyze the data from a particular industry-related process. Additionally, or alternatively, and as another example, the industry corpus may include industry features information that identifies features of an industry that are to be used to process the data (e.g., a machine learning model may be trained on the industry features, and may determine whether the data is in a form that matches the industry features).

As further shown in FIG. 2, the organization corpus may include organization features information that identifies organization features of an organization that are to be used to process the data (e.g., a machine learning model may be trained on the organization features, and may determine whether the data is in a form that matches the organization features).

As indicated above, FIG. 2 is provided merely as an example. Other examples are possible and may differ from what was described with regard to FIG. 2.

Figure 3:
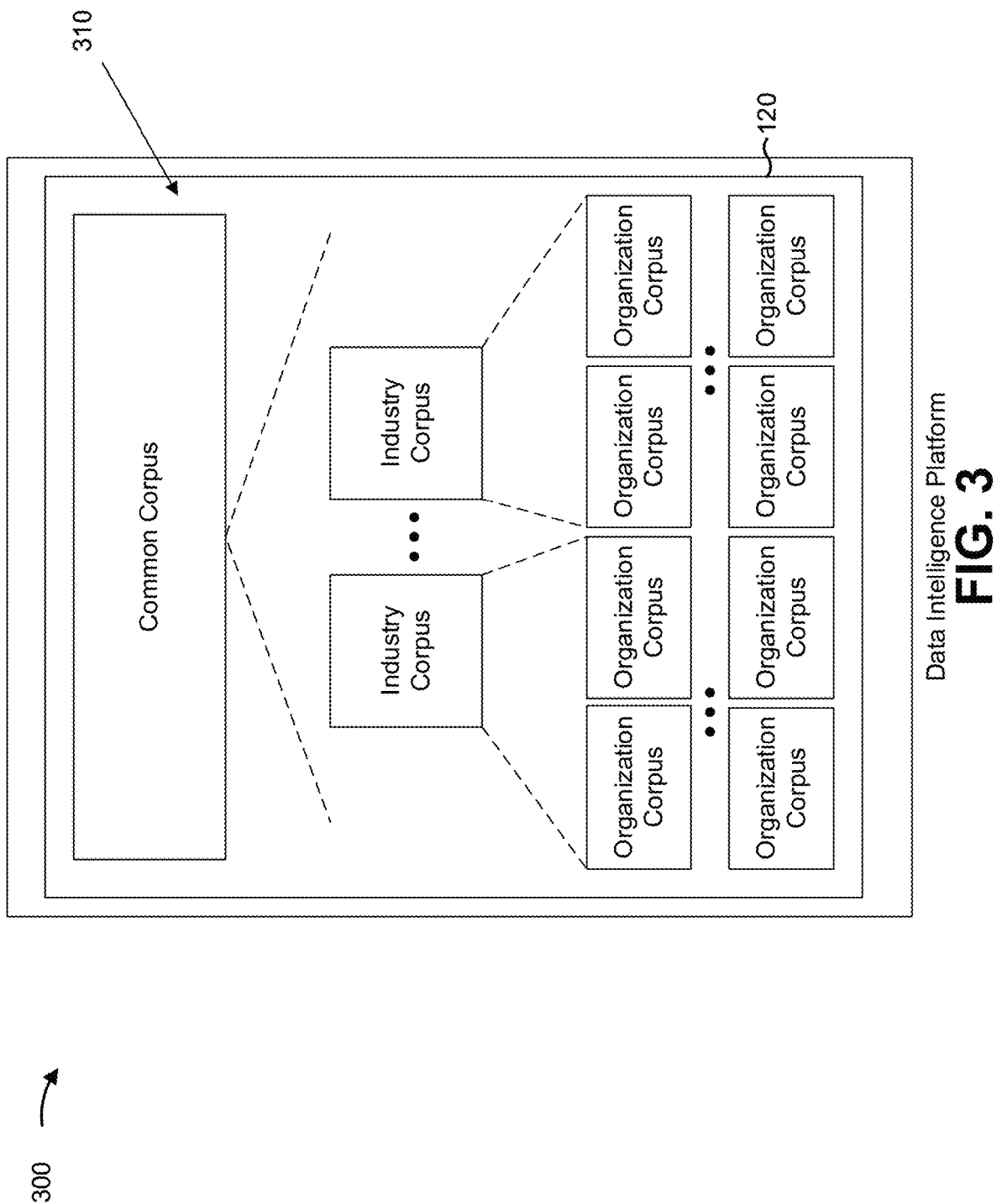
FIG. 3 is a diagram of an example implementation described herein.

FIG. 3 is a diagram of an example implementation 300 described herein. As shown in FIG. 3, implementation 300 includes the data intelligence platform and the corpus component of the data intelligence platform (shown by reference number 120). FIG. 3 shows an example relationship between various corpora described herein.

As shown by reference number 310, the common corpus may be used with various industry corpora and/or various organization corpora. As further shown by reference number 310, each of the various industry corpora may be used with a subset of the various organization corpora.

As indicated above, FIG. 3 is provided merely as an example. Other examples are possible and may differ from what was described with regard to FIG. 3.

Figure 4:
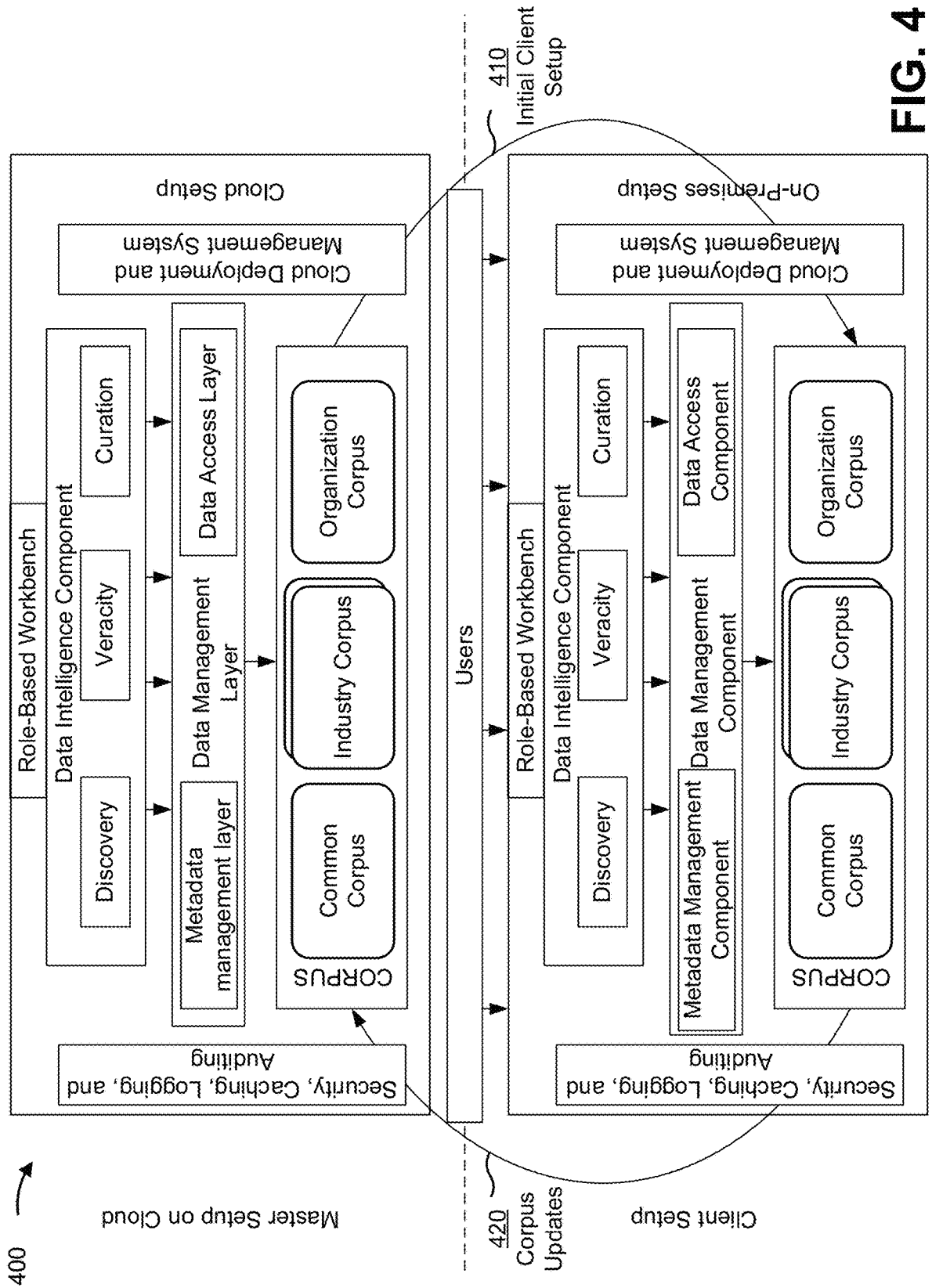
FIG. 4 is a diagram of an example implementation described herein.

FIG. 4 is a diagram of an example implementation 400 described herein. FIG. 4 shows an example of a deployment of the data intelligence platform.

As shown in FIG. 4, a master version of the data intelligence platform may be deployed in a cloud environment (shown by "Master Setup on Cloud"). For example, the master version of the data intelligence platform may be associated with a provider of the data intelligence platform. Additionally, or alternatively, the master version of the data intelligence platform may be used to deploy client-specific versions of the data intelligence platform (e.g., customized versions of the data intelligence platform) (e.g., shown by "Client Setup"). For example, the master version of the data intelligence platform may install client-specific versions of the data intelligence platform on computing resources associated with an organization.

As shown by reference number 410, the master version of the data intelligence platform may perform an initial client setup of corpora (or other aspects of the data intelligence platform) for the client-specific version of the data intelligence platform. For example, the master version of the data intelligence platform may install, on a corpus component of the client-specific version of the data intelligence platform, corpora specific to the organization and/or one or more industries associated with the organization. As shown by reference number 420, the master version of the data intelligence platform may receive, from the client-specific version of the data intelligence platform, corpus updates (or other information related to use and/or operation of the client-specific version of the data intelligence platform). For example, users of the client-specific version of the data intelligence platform may update the organization corpus and/or the one or more other industry corpora during use of the data intelligence platform, and these updates may be provided to the master version of the data intelligence platform. Additionally, or alternatively, and as another example, the client-specific version of the data intelligence platform may provide, to the master version of the data intelligence platform, information related to use of and/or operation of the client-specific version of the data intelligence platform. In some implementations, the data intelligence platform may update the corpora or other components of the data intelligence platform used for client-specific deployments of the data intelligence platform, may provide the updates to already deployed client-specific versions of the data intelligence platform, and/or the like.

As indicated above, FIG. 4 is provided merely as an example. Other examples are possible and may differ from what was described with regard to FIG. 4.

Figure 5:
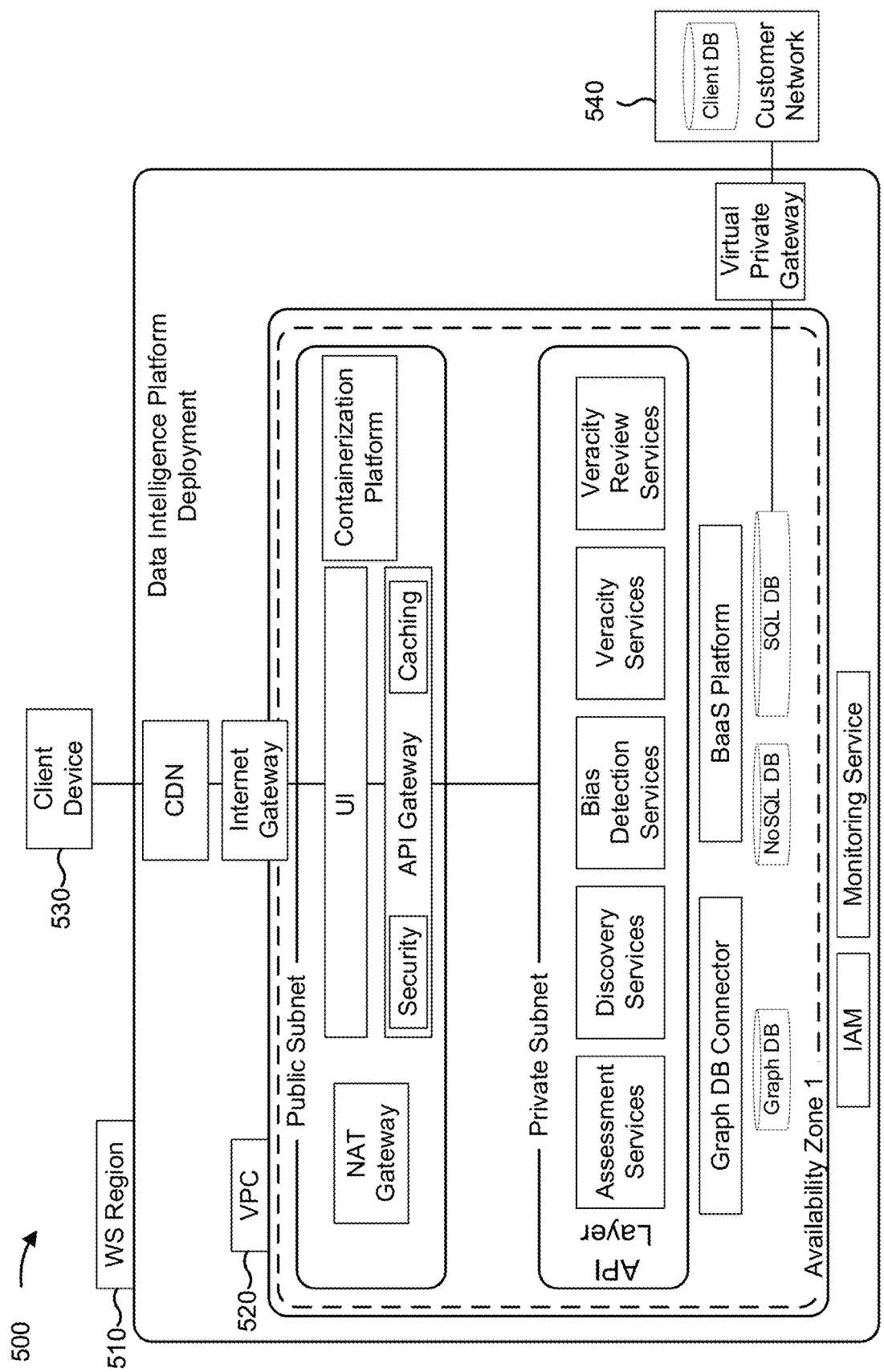
FIG. 5 is a diagram of an example implementation described herein.

FIG. 5 is a diagram of an example implementation 500 described herein. FIG. 5 shows an example deployment of the data intelligence platform and other devices and/or networks connected to the data intelligence platform.

As shown by reference number 510, deployment of the data intelligence platform may include a web services region. For example, the web services region may provide computing resources (e.g., cloud resources) on which the data intelligence platform is installed. In some implementations, the web services region may include a content delivery network (CDN) that provides data, applications, APIs, and/or the like associated with the data intelligence platform. Additionally, or alternatively, the web services region may include an internet gateway that connects the CDN to other elements of the deployment of the data intelligence platform.

Additionally, or alternatively, the web services region may include an integrated access management (IAM) component that manages access to and/or use of the data intelligence platform. Additionally, or alternatively, the web services region may include a monitoring service component that monitors and/or manages operation of the data intelligence platform, such as by gathering data related to operations of the data intelligence platform, analyzing the data related to the operations of the data intelligence platform, and/or the like. Additionally, or alternatively, the web services region may include a virtual private gateway to connect the data intelligence platform to a customer network (e.g., associated with an organization).

As shown by reference number 520, the web services region may include a virtual private cloud (VPC) that includes a configurable set of shared computing resources in a public subnet and/or a private subnet. In some implementations, the VPC may include a network address translation (NAT) gateway that provides connectivity to the internet and/or the web services region. Additionally, or alternatively, the VPC may include a set of user interface (UIs), similar to that described elsewhere herein. Additionally, or alternatively, the VPC may include a containerization platform to provide the set of containers described elsewhere herein. Additionally, or alternatively, the VPC may include API gateway associated with providing the set of APIs described elsewhere herein, providing connectivity between the set of containers and/or the set of microservices described elsewhere herein, and/or the like. In some implementations, the API gateway may provide security, caching, and/or the like services related to the APIs.

In some implementations, the private subnet of the VPC may include various services (e.g., microservices) connected to the API gateway via various APIs. In some implementations, the VPC may include a graph database (DB) connector to connect components of the data intelligence platform with a graph DB (e.g., a knowledge graph, similar to that described elsewhere herein). In some implementations, the VPC may include a backend-as-a-service (BaaS) platform to connect the various services described above and a structured query language (SQL) DB and/or a non-SQL DB (NoSQL DB).

As shown by reference number 530, the data intelligence platform may be connected to a client device in a manner that is the same as or similar to that described elsewhere herein. As shown by reference number 540, the data intelligence platform may be connected to a customer network (e.g., which may include a client DB that stores data related to an organization).

As indicated above, FIG. 5 is provided merely as an example. Other examples are possible and may differ from what was described with regard to FIG. 5.

Figure 6:
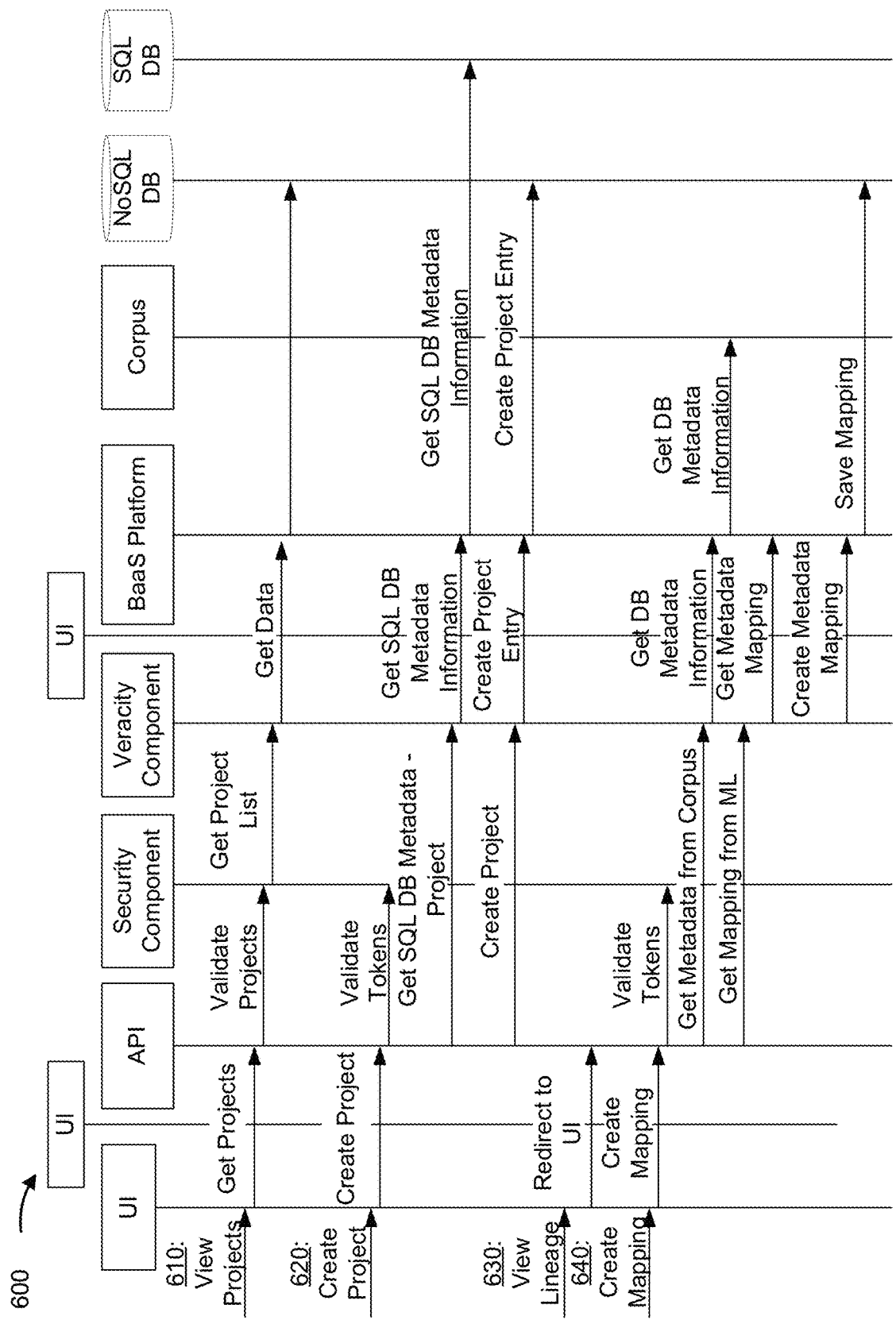
FIG. 6 is a diagram of an example implementation described herein.

FIG. 6 is a diagram of an example implementation 600 described herein. FIG. 6 shows example functionality and/or processes that may be available to an analyst role via the data intelligence platform.

As shown by reference number 610, the analyst role may view projects associated with the data intelligence platform. For example, the analyst role may access data related to analyses of data that the data intelligence platform is performing. As shown by reference number 620, the analyst role may create a project. For example, the analyst role may utilize the data intelligence platform to cause the data intelligence platform to start a new analysis of data.

As shown by reference number 630, the analyst role may view a lineage of data being analyzed by the data intelligence platform. For example, the analyst role may access data that identifies an origin of data being analyzed (e.g., a system and/or user that generated the data), a manner which the data has been modified since the origin of the data, and/or the like. As shown by reference number 640, the analyst role may create a mapping between different data sets. For example, the analyst role may create a mapping between data associated with an organization and a corpus (e.g., one of the corpora described elsewhere herein).

As indicated above, FIG. 6 is provided merely as an example. Other examples are possible and may differ from what was described with regard to FIG. 6.

Figure 7:
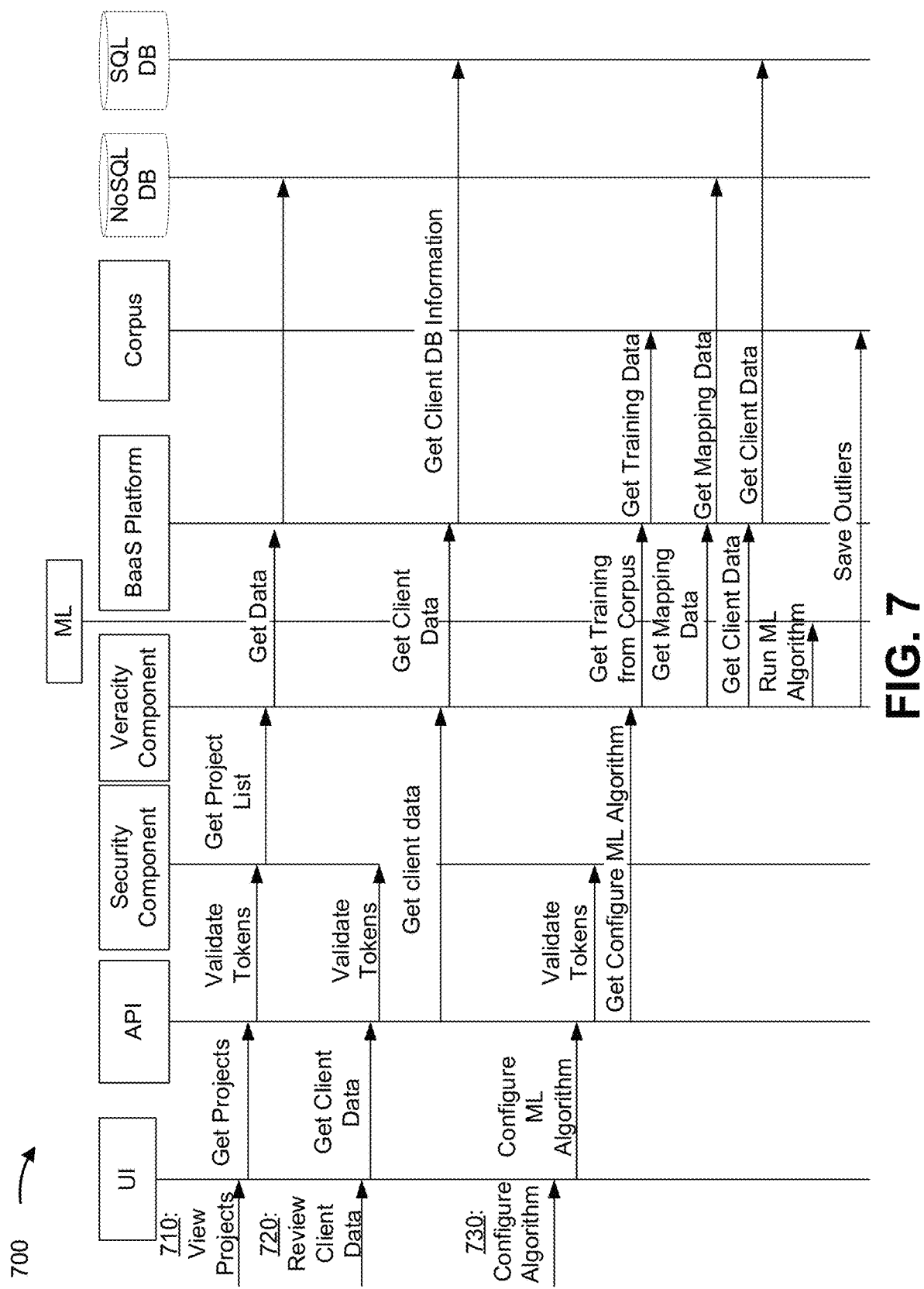
FIG. 7 is a diagram of an example implementation described herein.

FIG. 7 is a diagram of an example implementation 700 described herein. FIG. 7 shows example functionality and/or processes that may be available to a data scientist role via the data intelligence platform.

As shown by reference number 710, the data scientist role may view projects associated with the data intelligence platform. For example, the data scientist role may view projects associated with the data intelligence platform in a manner that is the same as or similar to that described above with regard to the data scientist role. As shown by reference number 720, the data scientist role may review client data via the data intelligence platform. For example, the data scientist may access data associated with an organization that the data intelligence platform is analyzing, data related to a result of an analysis performed by the data intelligence platform, and/or the like. As shown by reference number 730, the data scientist role may configure an algorithm implemented by the data intelligence platform related to analyzing data associated with an organization. For example, the data scientist role may configure a machine learning algorithm implemented by a machine learning model associated with the data intelligence platform.

As indicated above, FIG. 7 is provided merely as an example. Other examples are possible and may differ from what was described with regard to FIG. 7.

Figure 8:
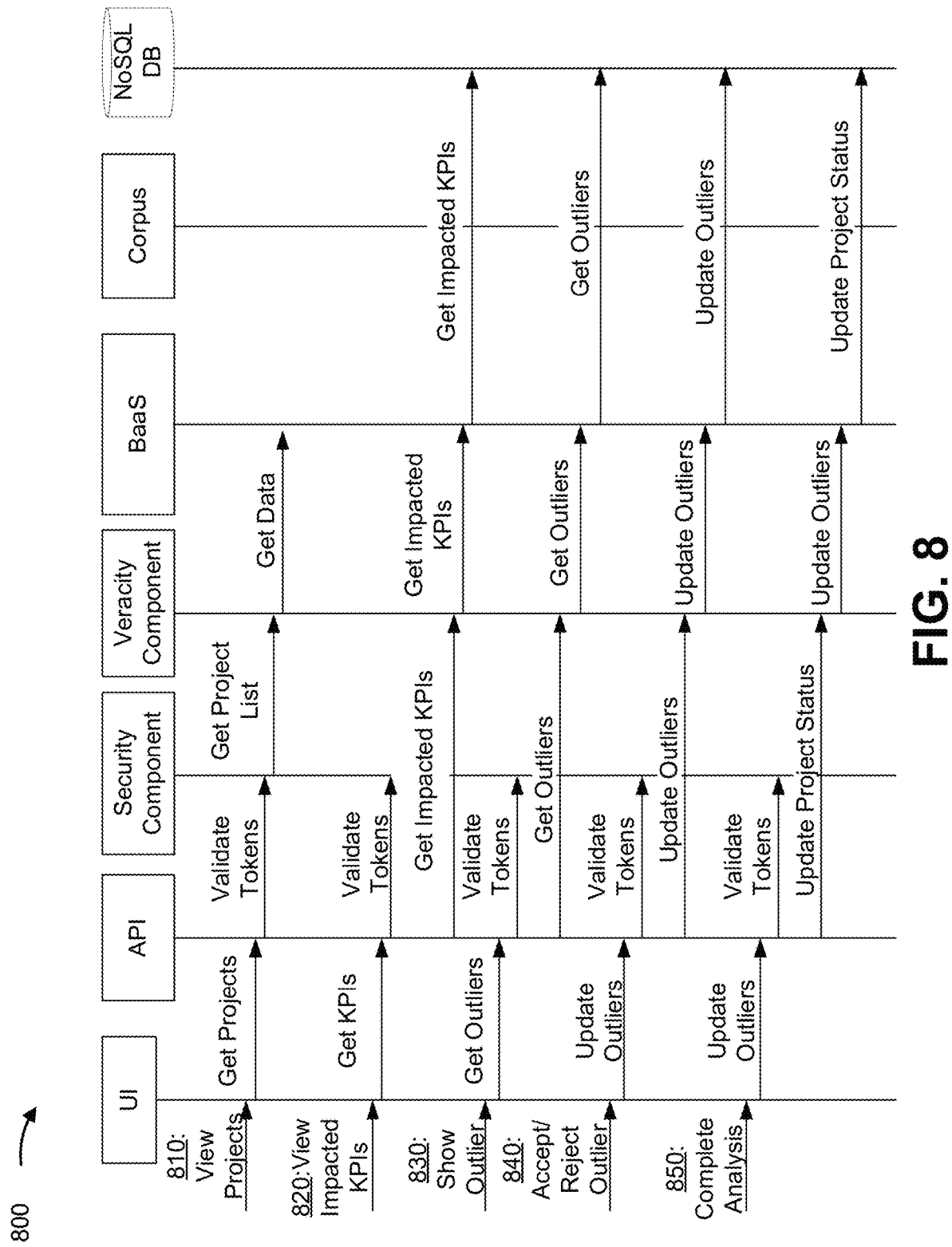
FIG. 8 is a diagram of an example implementation described herein.

FIG. 8 is a diagram of an example implementation 800 described herein. FIG. 8 shows example functionality and/or processes that may be available to a client data manager role via the data intelligence platform.

As shown by reference number 810, the client data manager role may view projects associated with the data intelligence platform. For example, the client data manager role may view projects associated with the data intelligence platform in a manner that is the same as or similar to that described elsewhere herein. As shown by reference number 820, the client data manager role may view impacted KPIs (or other metrics) associated with data associated with an organization. For example, the client data manager role may access data that identifies KPIs (or other metrics) that have unexpected values, that have had unexpected values for a threshold amount of time, and/or the like.

As shown by reference number 830, the client data manager role may cause the data intelligence platform to perform a show outlier action. For example, the client data manager role may cause the data intelligence platform to provide information for display that identifies outliers from the impacted KPIs (or other metrics) (e.g., KPIs with values that satisfy a threshold, that satisfy a threshold by a threshold amount, and/or the like). As shown by reference number 840, the client data manager role may accept and/or reject an outlier (e.g., an outlier from the impacted KPIs described above). For example, the client data manager role may cause the data intelligence platform to re-perform an analysis related to the outlier, may remove the outlier from a data set, may cause the data intelligence platform to include the outlier in an analysis and/or in a report related to the analysis, and/or the like. As shown by reference number 850, the client data manager role may cause the data intelligence platform to complete an analysis. For example, the client data manager role may cause the data intelligence platform to complete an analysis of data related to an organization (e.g., an analysis to identify an issue related to the data, to fix the data, and/or the like).

As indicated above, FIG. 8 is provided merely as an example. Other examples are possible and may differ from what was described with regard to FIG. 8.

In this way, as described with regard to FIGS. 6-8, the data intelligence platform may provide role-based access to functionality of the data intelligence platform, thereby increasing a security of the data intelligence platform.

Figure 9:
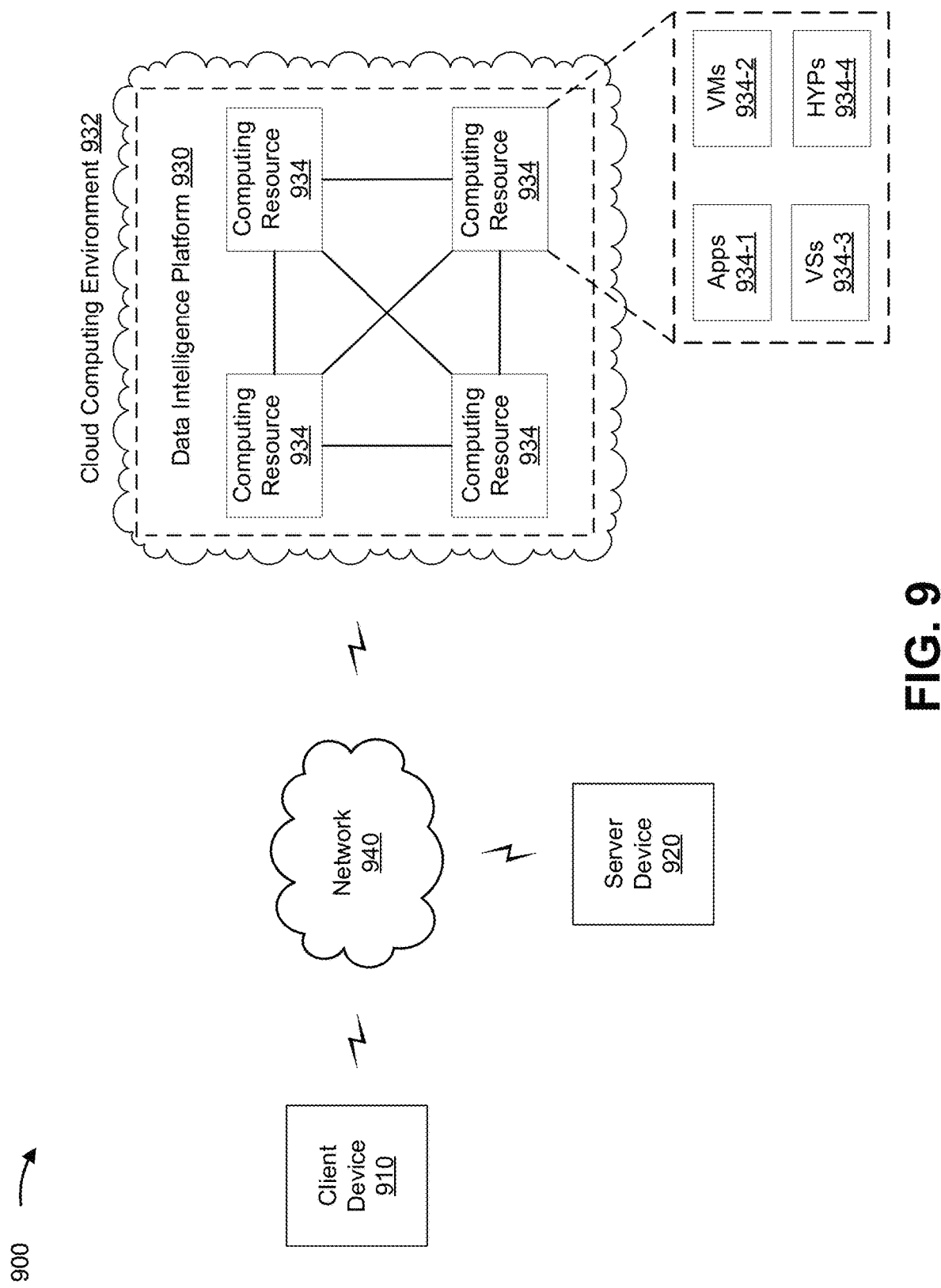
FIG. 9 is a diagram of an example environment in which systems and/or methods, described herein, may be implemented.

FIG. 9 is a diagram of an example environment 900 in which systems and/or methods, described herein, may be implemented. As shown in FIG. 9, environment 900 may include a client device 910, a server device 920, a data intelligence platform 930 hosted within a cloud computing environment 932 that includes a set of computing resources 934, and a network 940. Devices of environment 900 may interconnect via wired connections, wireless connections, or a combination of wired and wireless connections.

Client device 910 includes one or more devices capable of receiving, generating, storing, processing, and/or providing data associated with an organization. For example, client device 910 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, client device 910 may provide, to data intelligence platform 930, information related to an analysis that data intelligence platform 930 performed, as described elsewhere herein.

Server device 920 includes one or more devices capable of receiving, generating storing, processing, and/or providing data associated with an organization. For example, server device 920 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 920 may include a communication interface that allows server device 920 to receive information from and/or transmit information to other devices in environment 900. In some implementations, server device 920 may be a physical device implemented within a housing, such as a chassis. In some implementations, server device 920 may be a virtual device implemented by one or more computer devices of a cloud computing environment or a data center. In some implementations, server device 920 may provide, to data intelligence platform 930, data to be processed by data intelligence platform 930, as described elsewhere herein.

Data intelligence platform 930 includes one or more devices capable of receiving, generating, storing, processing, and/or providing data associated with an organization. For example, data intelligence platform 930 may include a cloud server or a group of cloud servers. In some implementations, data intelligence platform 930 may be designed to be modular such that certain software components can be swapped in or out depending on a particular need. As such, data intelligence platform 930 may be easily and/or quickly reconfigured for different uses.

In some implementations, as shown in FIG. 9, data intelligence platform 930 may be hosted in cloud computing environment 932. Notably, while implementations described herein describe data intelligence platform 930 as being hosted in cloud computing environment 932, in some implementations, data intelligence platform 930 may not be cloud-based (i.e., may be implemented outside of a cloud computing environment) or may be partially cloud-based.

Cloud computing environment 932 includes an environment that hosts data intelligence platform 930. Cloud computing environment 932 may provide computation, software, data access, storage, and/or other services that do not require end-user knowledge of a physical location and configuration of a system and/or a device that hosts data intelligence platform 930. As shown, cloud computing environment 932 may include a group of computing resources 934 (referred to collectively as "computing resources 934" and individually as "computing resource 934").

Computing resource 934 includes one or more personal computers, workstation computers, server devices, or another type of computation and/or communication device. In some implementations, computing resource 934 may host data intelligence platform 930. The cloud resources may include compute instances executing in computing resource 934, storage devices provided in computing resource 934, data transfer devices provided by computing resource 934, etc. In some implementations, computing resource 934 may communicate with other computing resources 934 via wired connections, wireless connections, or a combination of wired and wireless connections.

As further shown in FIG. 9, computing resource 934 may include a group of cloud resources, such as one or more applications ("APPs") 934-1, one or more virtual machines ("VMs") 934-2, one or more virtualized storages ("VSs") 934-3, or one or more hypervisors ("HYPs") 934-4.

Application 934-1 includes one or more software applications that may be provided to or accessed by one or more devices of environment 900. Application 934-1 may eliminate a need to install and execute the software applications on devices of environment 900. For example, application 934-1 may include software associated with data intelligence platform 930 and/or any other software capable of being provided via cloud computing environment 932. In some implementations, one application 934-1 may send/receive information to/from one or more other applications 934-1, via virtual machine 934-2. In some implementations, application 934-1 may include a software application associated with one or more databases and/or operating systems. For example, application 934-1 may include an enterprise application, a functional application, an analytics application, and/or the like.

Virtual machine 934-2 includes a software implementation of a machine (e.g., a computer) that executes programs like a physical machine. Virtual machine 934-2 may be either a system virtual machine or a process virtual machine, depending upon use and degree of correspondence to any real machine by virtual machine 934-2. A system virtual machine may provide a complete system platform that supports execution of a complete operating system ("OS"). A process virtual machine may execute a single program, and may support a single process. In some implementations, virtual machine 934-2 may execute on behalf of a user (e.g., a user of client device 910), and may manage infrastructure of cloud computing environment 932, such as data management, synchronization, or long-duration data transfers.

Virtualized storage 934-3 includes one or more storage systems and/or one or more devices that use virtualization techniques within the storage systems or devices of computing resource 934. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 934-4 provides hardware virtualization techniques that allow multiple operating systems (e.g., "guest operating systems") to execute concurrently on a host computer, such as computing resource 934. Hypervisor 934-4 may present a virtual operating platform to the guest operating systems, and may manage the execution of the guest operating systems. Multiple instances of a variety of operating systems may share virtualized hardware resources.

Network 940 includes one or more wired and/or wireless networks. For example, network 940 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) of environment 900 may perform one or more functions described as being performed by another set of devices of environment 900.

Figure 10:
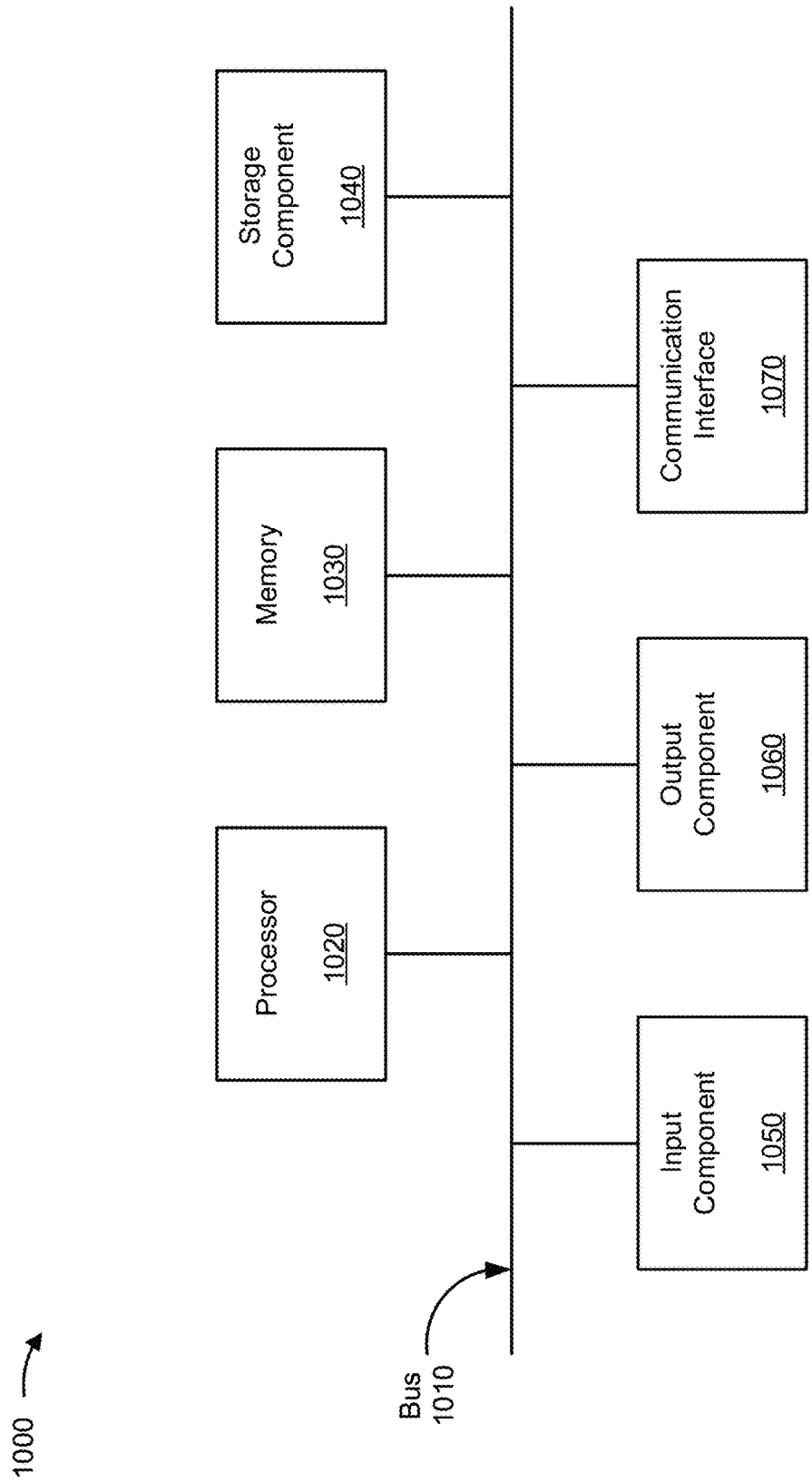
FIG. 10 is a diagram of example components of one or more devices of FIG. 2.

FIG. 10 is a diagram of example components of a device 1000. Device 1000 may correspond to client device 910, server device 920, data intelligence platform 930, and/or computing resource 934. In some implementations, client device 910, server device 920, data intelligence platform 930, and/or computing resource 934 may include one or more devices 1000 and/or one or more components of device 1000. As shown in FIG. 10, device 1000 may include a bus 1010, a processor 1020, a memory 1030, a storage component 1040, an input component 1050, an output component 1060, and a communication interface 1070.

Bus 1010 includes a component that permits communication among the components of device 1000. Processor 1020 is implemented in hardware, firmware, or a combination of hardware and software. Processor 1020 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1020 includes one or more processors capable of being programmed to perform a function. Memory 1030 includes a random access memory (RAM), a read only memory (ROM), and/or another type of dynamic or static storage device (e.g., a flash memory, a magnetic memory, and/or an optical memory) that stores information and/or instructions for use by processor 1020.

Storage component 1040 stores information and/or software related to the operation and use of device 1000. For example, storage component 1040 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 1050 includes a component that permits device 1000 to receive information, such as via user input (e.g., a touch screen display, a keyboard, a keypad, a mouse, a button, a switch, and/or a microphone). Additionally, or alternatively, input component 1050 may include a sensor for sensing information (e.g., a global positioning system (GPS) component, an accelerometer, a gyroscope, and/or an actuator). Output component 1060 includes a component that provides output information from device 1000 (e.g., a display, a speaker, and/or one or more light-emitting diodes (LEDs)).

Communication interface 1070 includes a transceiver-like component (e.g., a transceiver and/or a separate receiver and transmitter) that enables device 1000 to communicate with other devices, such as via a wired connection, a wireless connection, or a combination of wired and wireless connections. Communication interface 1070 may permit device 1000 to receive information from another device and/or provide information to another device. For example, communication interface 1070 may include an Ethernet interface, an optical interface, a coaxial interface, an infrared interface, a radio frequency (RF) interface, a universal serial bus (USB) interface, a Wi-Fi interface, a cellular network interface, or the like.

Device 1000 may perform one or more processes described herein. Device 1000 may perform these processes based on to processor 1020 executing software instructions stored by a non-transitory computer-readable medium, such as memory 1030 and/or storage component 1040. A computer-readable medium is defined herein as a non-transitory memory device. A memory device includes memory space within a single physical storage device or memory space spread across multiple physical storage devices.

Software instructions may be read into memory 1030 and/or storage component 1040 from another computer-readable medium or from another device via communication interface 1070. When executed, software instructions stored in memory 1030 and/or storage component 1040 may cause processor 1020 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 10 are provided as an example. In practice, device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

Figure 11:
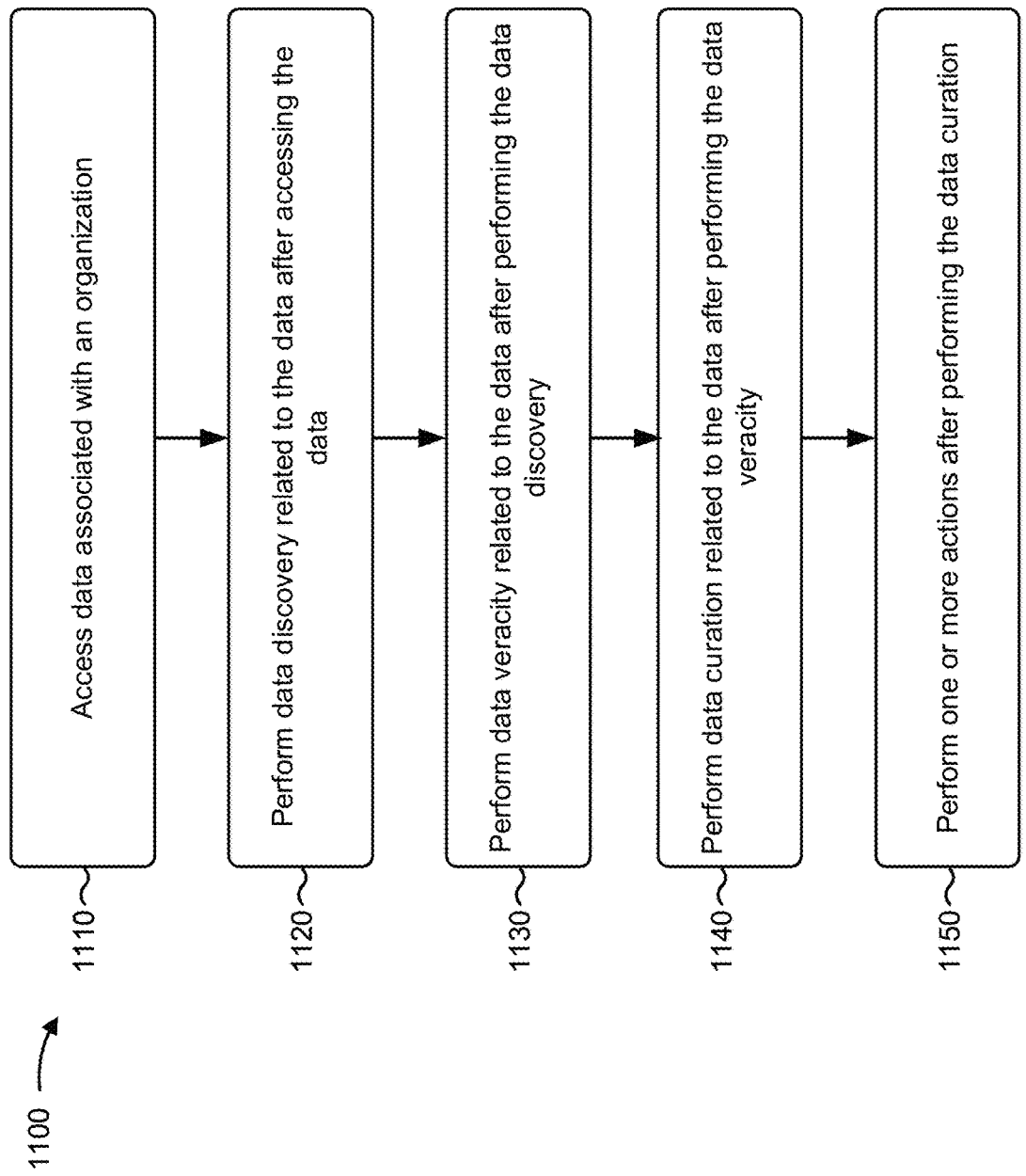
FIG. 11 is a flow chart of an example process for identifying an issue associated with data.

FIG. 11 is a flow chart of an example process 1100 for identifying an issue associated with data. In some implementations, one or more process blocks of FIG. 11 may be performed by a data intelligence platform (e.g., data intelligence platform 930). In some implementations, one or more process blocks of FIG. 11 may be performed by another device or a group of devices separate from or including the data intelligence platform, such as a client device (e.g., client device 910), a server device (e.g., server device 920), and a computing resource (e.g., computing resource 934).

As shown in FIG. 11, process 1100 may include accessing data associated with an organization (block 1110). For example, the data intelligence platform (e.g., data intelligence platform 930 using computing resource 934, processor 1020, communication interface 1070, and/or the like) may access data associated with an organization, in a manner that is the same as or similar to that described elsewhere herein.

As further shown in FIG. 11, process 1100 may include performing data discovery related to the data after accessing the data (block 1120). For example, the data intelligence platform (e.g., data intelligence platform 930 using computing resource 934, processor 1020, and/or the like) may perform data discovery related to the data after accessing the data, in a manner that is the same as or similar to that described elsewhere herein.

As further shown in FIG. 11, process 1100 may include performing data veracity related to the data after performing the data discovery (block 1130). For example, the data intelligence platform (e.g., data intelligence platform 930 using computing resource 934, processor 1020, and/or the like) may perform data veracity related to the data after performing the data discovery, in a manner that is the same as or similar to that described elsewhere herein.

As further shown in FIG. 11, process 1100 may include performing data curation related to the data after performing the data veracity (block 1140). For example, the data intelligence platform (e.g., data intelligence platform 930 using computing resource 934, processor 1020, and/or the like) may perform data curation related to the data after performing the data veracity, in a manner that is the same as or similar to that described elsewhere herein.

As further shown in FIG. 11, process 1100 may include performing one or more actions after performing the data curation (block 1150). For example, the data intelligence platform (e.g., data intelligence platform 930 using computing resource 934, processor 1020, memory 1030, storage component 1040, input component 1050, output component 1060, communication interface 1070, and/or the like) may perform one or more actions after performing the data curation, in a manner that is the same as or similar to that described elsewhere herein.

Process 1100 may be performed by a data intelligence platform, such as a data intelligence platform that includes any single implementation or any combination of implementations described below and/or in connection with one or more other data intelligence platform described elsewhere herein.

In some implementations, the data intelligence platform may include a role-based workbench component configured to control access to or use of the data intelligence platform, wherein the role-based workbench component comprises a set of user interfaces associated with at least one of: different roles, associated with an organization, that are permitted to use the data intelligence platform, or different functionalities of the data intelligence platform. Additionally, or alternatively, the data intelligence platform may include a data intelligence component configured to: process data, utilizing a set of microservices or a set of models, to identify an issue related to the data, wherein the data is associated with the organization, or perform a set of actions related to fixing the issue related to the data based on a result of processing the data utilizing the set of microservices or the set of models. Additionally, or alternatively, the data intelligence platform may include a data management component configured to facilitate access to a corpus component or to a source of the data. Additionally, or alternatively, the data intelligence platform may include the corpus component configured to facilitate processing of the data to identify the issue or to perform the set of actions, wherein the corpus component stores at least one of: a common corpus related to various industries or organizations, an industry corpus related to an industry associated with the organization, or an organization corpus related to the organization.

In some implementations, the role-based workbench component is connected to the data intelligence component via a JavaScript Object Notation (JSON) connection. In some implementations, the data management component includes at least one of: a metadata management component configured to manage metadata related to the data, or a data access component configured to manage access to the data.

In some implementations, the data intelligence component is further configured to perform at least one of: data discovery related to the data, data veracity related to the data, or data curation related to the data. In some implementations, the common corpus includes information that identifies at least one of: a data model used across the various industries or organizations, a data dictionary associated with the various industries or organizations, or data metrics associated with the various industries or organizations.

In some implementations, the industry corpus includes information that identifies at least one of: a data model associated with the industry, a set of data metrics associated with the industry, a data dictionary associated with the industry, a process-to-metric mapping for the industry, a process-to-organization mapping for the industry, or a process-to-functional area mapping for the industry. In some implementations, the organization corpus includes information that identifies at least one of: a set of rules for the data associated with the organization, a data dictionary associated with the organization, or a set of attributes included in data elements included in the data.

Additionally, or alternatively, a data intelligence platform, described herein, may include a role-based workbench component configured to control access to or use of the data intelligence platform to identify an issue associated with data associated with an organization, wherein the role-based workbench component comprises a set of user interfaces associated with at least one of: different roles, associated with the organization, that are permitted to use the data intelligence platform, or different functionalities of the data intelligence platform. Additionally, or alternatively, such a data intelligence platform may include a data intelligence component configured to: process the data, utilizing a set of microservices or a set of models, to identify the issue related to the data, or perform a set of actions related to fixing the issue related to the data based on a result of processing the data utilizing the set of microservices or the set of models. Additionally, or alternatively, such a data intelligence platform may include a data management component configured to facilitate access to a corpus component or to a source of the data. Additionally, or alternatively, such a data intelligence platform may include the corpus component configured to facilitate processing of the data to identify the issue or to perform the set of actions, wherein the corpus component stores a set of corpora to be used to process the data or to perform the set of actions.

In some implementations, the data intelligence platform is deployed on cloud resources associated with a provider of the data intelligence platform, and a copy of the data intelligence platform is deployed on cloud resources or local computing resources associated with a user of the data intelligence platform. In some implementations, the data intelligence platform is deployed via a cloud deployment or via a local deployment at a location associated with the organization.

In some implementations, the data intelligence component, when processing the data, is configured to: identify, utilizing the set of microservices or the set of models, the data in the source of the data, or identify a structure of the data in the source of the data. In some implementations, the data intelligence component, when processing the data, is configured to: detect, utilizing the set of microservices or the set of models, an anomaly in the data that is indicative of the issue.

In some implementations, the data intelligence component comprises: a discovery component, a veracity component, or a curation component. In some implementations, the set of corpora includes at least one of: a common corpus related to various industries or organizations, an industry corpus related to an industry associated with the organization, or an organization corpus related to the organization.

Additionally, or alternatively, a data intelligence platform, described herein, may include a role-based workbench component configured to control access to or use of one or more other components of the data intelligence platform. Additionally, or alternatively, such a data intelligence platform may include a data intelligence component configured to: process data, utilizing a set of microservices or a set of models, to perform at least one of: data discovery related to the data, data veracity related to the data, or data curation related to the data, or perform a set of actions related to fixing an issue identified in the data based on a result of processing the data utilizing the set of microservices or the set of models. Additionally, or alternatively, such a data intelligence platform may include a data source configured to store the data. Additionally, or alternatively, such a data intelligence platform may include a data management component configured to facilitate access to a corpus component or to the data source of the data, wherein the data management component comprises: a metadata management component, or a data access component. Additionally, or alternatively, such a data intelligence platform may include the corpus component configured to facilitate, via use of a set of corpora, processing of the data or performing the set of actions.

In some implementations, the data intelligence platform utilizes a set of common services for one or more components of the data intelligence platform, wherein the set of common services includes at least one of: a security service, a caching service, a logging service, or an auditing service. In some implementations, the metadata management component is configured to manage metadata related to the data.

In some implementations, the data access component is configured to manage access to the data. In some implementations, the data intelligence platform utilizes a set of representational state transfer (REST) application programming interfaces (APIs) to connect the set of microservices with each other, to connect the set of models with each other, or to connect the set of microservices and the set of models. In some implementations, the corpus component comprises: a common corpus component, an industry corpus component, or an enterprise corpus component.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A data intelligence platform, comprising:
a memory; and
one or more processors to:
control access to or use of the data intelligence platform via a role-based workbench component,
wherein the role-based workbench component comprises a set of user interfaces associated with at least one of:
different roles, associated with an organization, that are permitted to use the data intelligence platform, or
different functionalities of the data intelligence platform;
process data, utilizing a data intelligence component including a set of microservices, to identify an issue related to the data,
wherein the data is associated with the organization,
wherein the set of microservices include a discovery microservice to perform data discovery by generating a virtual map of sources of the data, a veracity microservice to perform data veracity by determining a completeness of the data and whether the data is properly formatted based on a need of a first department of the organization, and a curation microservice to perform data curation, and
wherein the discovery microservice, the veracity microservice, and the curation microservice are independently deployed via separately deployed modularized containers and are connected to one another via a set of representation state transfer (REST) application programming interfaces (APIs);
perform, utilizing the data intelligence component, a set of actions related to fixing the issue related to the data based on a result of processing the data utilizing the set of microservices,
when the data is determined not to be properly formatted, the set of actions include formatting the data, in a different way than originally formatted by a second department of the organization, and based on the need of the first department of the organization; and
facilitate, utilizing a data management component, access to a corpus component and to a source of the data,
wherein the corpus component stores at least one of:

a common corpus related to various industries or organizations,
an industry corpus related to an industry associated with the organization, or
an organization corpus related to the organization.

2. The data intelligence platform of claim 1, wherein the role-based workbench component is connected to the data intelligence component via a JavaScript Object Notation (JSON) connection.

3. The data intelligence platform of claim 1, wherein data management component includes at least one of:
a metadata management component configured to manage metadata related to the data, or
a data access component configured to manage access to the data.

4. The data intelligence platform of claim 1, wherein the one or more processors are further to perform, via the data intelligence component, at least one of:
data discovery related to the data,
data veracity related to the data, or
data curation related to the data.

5. The data intelligence platform of claim 1, wherein the common corpus includes information that identifies at least one of:
a data model used across the various industries or organizations,
a data dictionary associated with the various industries or organizations, or
data metrics associated with the various industries or organizations.

6. The data intelligence platform of claim 1, wherein the industry corpus includes information that identifies at least one of:
a data model associated with the industry,
a set of data metrics associated with the industry,
a data dictionary associated with the industry,
a process-to-metric mapping for the industry,
a process-to-organization mapping for the industry, or
a process-to-functional area mapping for the industry.

7. The data intelligence platform of claim 1, wherein the organization corpus includes information that identifies at least one of:
a set of rules for the data associated with the organization,
a data dictionary associated with the organization, or
a set of attributes included in data elements included in the data.

8. A system, comprising:
a memory; and
one or more processors to:
control, via a role-based workbench component, access to or use of the system to identify an issue associated with data associated with an organization,
wherein the role-based workbench component comprises a set of user interfaces associated with at least one of:
different roles, associated with the organization, that are permitted to use the system, or
different functionalities of the system;
process the data, utilizing a data intelligence component including a set of microservices, to identify the issue related to the data,
wherein the set of microservices include a discovery microservice to perform data discovery by generating a virtual map of sources of the data, a veracity microservice to perform data veracity by determining a completeness of the data and whether the data is properly formatted based on a need of a first department of the organization, and
a curation microservice to perform data curation, and
wherein the discovery microservice, the veracity microservice, and the curation microservice are independently deployed via separately deployed modularized containers and are connected to one another via a set of representation state transfer (REST) application programming interfaces (APIs);
perform, utilizing the data intelligence component, a set of actions related to fixing the issue related to the data based on a result of processing the data utilizing the set of microservices or the set of models,
wherein, when the data is determined not to be properly formatted, the set of actions include formatting the data, in a different way than originally formatted by a second department of the organization, and based on the need of the first department of the organization; and
facilitate, utilizing a data management component, access to a corpus component and to a source of the data,
wherein the corpus component stores a set of corpora to be used to process the data or to perform the set of actions.

9. The system of claim 8, wherein the system is deployed on cloud resources associated with a provider of the system, and a copy of the system is deployed on cloud resources or local computing resources associated with a user of the system.

10. The system of claim 8, wherein the system is deployed via a cloud deployment or via a local deployment at a location associated with the organization.

11. The system of claim 8, wherein the one or more processors, when processing the data, are to:
identify, utilizing the set of microservices, the data in the source of the data, or
identify a structure of the data in the source of the data.

12. The system of claim 8, wherein the one or more processors, when processing the data, are to:
detect, utilizing the set of microservices, an anomaly in the data that is indicative of the issue.

13. The system of claim 8, wherein the set of corpora includes at least one of:
a common corpus related to various industries or organizations,
an industry corpus related to an industry associated with the organization, or
an organization corpus related to the organization.

14. A method, comprising:
controlling, via a role-based workbench component of a device, access to or use of one or more other components of the device;
processing data, utilizing a data intelligence component of a device that includes a set of microservices, to perform at least one of:
data discovery related to the data,
data veracity related to the data, or
data curation related to the data,
performing, utilizing the data intelligence component of the device, a set of actions related to fixing an issue identified in the data based on a result of processing the data utilizing the set of microservices,
wherein the set of microservices include a discovery microservice to perform data discovery by generating a virtual map of sources of the data, a veracity microservice to perform data veracity by determining a completeness of the data and whether the data is properly formatted based on a need of a first department of an organization, and a curation microservice to perform data curation,
wherein the discovery microservice, the veracity microservice, and the curation microservice are independently deployed via separately deployed modularized containers and are connected to one another via a set of representation state transfer (REST) application programming interfaces (APIs), and
wherein, when the data is determined not to be properly formatted, the set of actions include formatting the data, in a different way than originally formatted by a second department of the organization, and based on a need of a first department of the organization;
facilitating, via a data management component of the device, access to a corpus component of the device or to a data source of the data,
wherein the data management component comprises:
a metadata management component, or
a data access component; and
facilitating, via the corpus component and using a set of corpora, processing of the data or performing the set of actions.

15. The method of claim 14, wherein the device utilizes a set of common services for one or more components of the device,
wherein the set of common services includes at least one of:
a security service,
a caching service,
a logging service, or
an auditing service.

16. The method of claim 14, further comprising:
managing, via the data management component, metadata related to the data.

17. The method of claim 14, wherein the corpus component comprises:
a common corpus component,
an industry corpus component, or
an enterprise corpus component.

18. The method of claim 14, further comprising:
determining, via the veracity microservice, whether the data includes duplicative data elements.

19. The method of claim 14, further comprising:
determining, via the veracity microservice, whether the data conforms to an encryption rule.

20. The method of claim 14, further comprising:
determining, via the veracity microservice, a manner in which the data has been manipulated after being generated via use of metadata.

* * * * *